(12) United States Patent
Tang et al.

(10) Patent No.: US 8,780,457 B2
(45) Date of Patent: Jul. 15, 2014

(54) OPTICAL PHOTOGRAPHING SYSTEM

(71) Applicant: Largan Precision Co., Ltd., Taichung (TW)

(72) Inventors: Hsiang-Chi Tang, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 98 days.

(21) Appl. No.: 13/691,855

(22) Filed: Dec. 3, 2012

(65) Prior Publication Data

US 2014/0111872 A1  Apr. 24, 2014

(30) Foreign Application Priority Data

Oct. 22, 2012  (TW) .............................. 101138921 A

(51) Int. Cl.
  *G02B 13/18*  (2006.01)
  *G02B 13/00*  (2006.01)
(52) U.S. Cl.
  CPC ................................. *G02B 13/0045* (2013.01)
  USPC ........................................... 359/713; 359/757
(58) Field of Classification Search
  CPC .................................. G02B 13/18; G02B 9/62
  USPC .......................................... 359/713, 752, 757
  See application file for complete search history.

(56) References Cited

U.S. PATENT DOCUMENTS 8,390,940 B2 * 3/2013 Tsai et al. ..................... 359/713

* cited by examiner

*Primary Examiner* — William Choi
(74) *Attorney, Agent, or Firm* — CKC & Partners Co., Ltd.

(57) ABSTRACT

An optical photographing system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element with negative refractive power has an object-side surface being concave at a paraxial region thereof. The third lens element has refractive power. The fourth lens element has refractive power. The fifth lens element with positive refractive power has an image-side surface being convex at a paraxial region thereof, and the surfaces thereof are aspheric. The sixth lens element with refractive power has an image-side surface changing from concave at a paraxial region thereof to convex at a peripheral region thereof, and the surfaces thereof are aspheric.

26 Claims, 15 Drawing Sheets

US 8,780,457 B2

OPTICAL PHOTOGRAPHING SYSTEM

RELATED APPLICATIONS

The application claims priority to Taiwan Application Serial Number 101138921 filed Oct. 22, 2012, which is herein incorporated by reference.

BACKGROUND

1. Technical Field

The present invention relates to an optical photographing system. More particularly, the present invention relates to a compact optical photographing system applicable to electronic products.

2. Description of Related Art

In recent years, with the popularity of mobile products with camera functionalities, the demand of optical lens systems is increasing. The sensor of a conventional optical lens system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure or a five-element lens structure such as the one disclosed in U.S. Pat. No. 7,869,142 and the one disclosed in U.S. Pat. No. 8,000,031. Due to the popularity of mobile products with high-end specifications, such as smart phones and PDAs (Personal Digital Assistants), the pixel and image-quality requirements of the compact optical lens system have increased rapidly. However, the conventional four-element lens structure or five-element lens structure cannot satisfy the requirements of the compact optical lens system.

Although there are other conventional optical lens systems with six-element lens structure, such as the one disclosed in U.S. Publication No. 2012/0229917. However, the distribution of the refractive power of the optical lens system is improper, so that the total track length thereof cannot be reduced effectively. Furthermore, the surface curvature of the second lens element has limited ability for correcting the aberration of the optical lens system and reducing the sensitivity thereof. Therefore, the optical lens system is hard to apply to portable electronics featuring high image quality.

SUMMARY

According to one aspect of the present disclosure, an optical photographing system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element with negative refractive power has an object-side surface being concave at a paraxial region thereof. The third lens element has refractive power. The fourth lens element has refractive power. The fifth lens element with positive refractive power has an image-side surface being convex at a paraxial region thereof, wherein an object-side surface and the image-side surface of the fifth lens element are aspheric. The sixth lens element with refractive power has an image-side surface, wherein the image-side surface of the sixth lens element changes from concave at a paraxial region thereof to convex at a peripheral region thereof, and an object-side surface and the image-side surface of the sixth lens element are aspheric. When a curvature radius of the object-side surface of the second lens element is R3, and a curvature radius of an image-side surface of the second lens element is R4, the following relationship is satisfied:

$-0.70 < R3/|R4| \leq 0.$

According to another aspect of the present disclosure, an optical photographing system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element with negative refractive power has an object-side surface being concave at a paraxial region thereof and an image-side surface being convex or planar at a paraxial region thereof. The third lens element has positive refractive power. The fourth lens element has refractive power. The fifth lens element with positive refractive power has an image-side surface being convex at a paraxial region thereof, wherein an object-side surface and the image-side surface of the fifth lens element are aspheric. The sixth lens element with negative refractive power has an image-side surface, wherein the image-side surface of the sixth lens element changes from concave at a paraxial region thereof to convex at a peripheral region thereof, and an object-side surface and the image-side surface of the sixth lens element are aspheric. When a curvature radius of the object-side surface of the second lens element is R3, and a curvature radius of the image-side surface of the second lens element is R4, the following relationship is satisfied:

$-0.70 < R3/|R4| \leq 0.$

BRIEF DESCRIPTION OF THE DRAWINGS

The disclosure can be more fully understood by reading the following detailed description of the embodiments, with reference made to the to accompanying drawings as follows.

DETAILED DESCRIPTION

Figure 1:
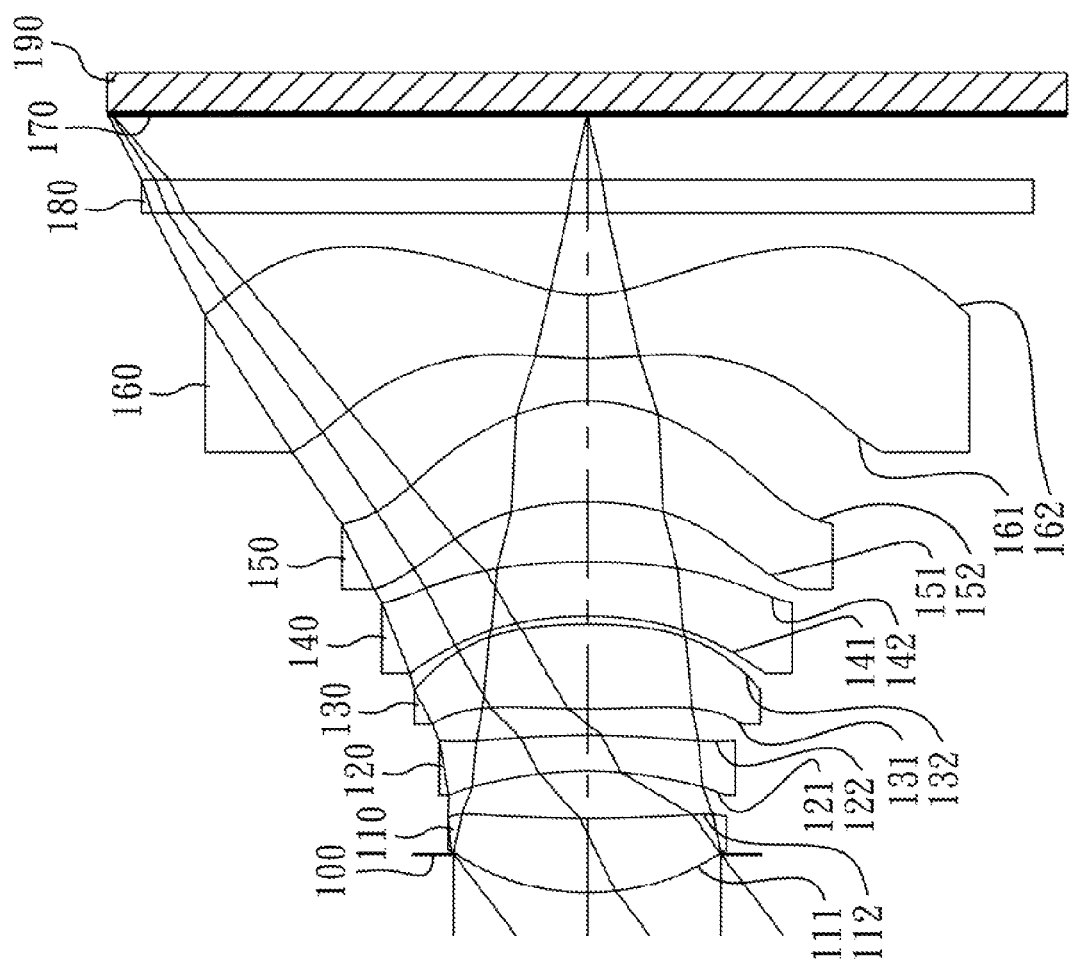
FIG. 1 is a schematic view of an optical photographing system according to the 1st embodiment of the present disclosure.

An optical photographing system includes, in order from an object side to an image side, a first lens element, a second lens element, a third lens element, a fourth lens element, a fifth lens element, and a sixth lens element. The optical photographing system can further include an image sensor located on an image plane.

The first lens element with positive refractive power has an object-side surface being convex at a paraxial region thereof, and can have an image-side surface being concave at a paraxial region thereof, so that the positive refractive power of the first lens element can be further enhanced, and the total track length of the optical photographing system can be reduced.

The second lens element has negative refractive power, so that the aberration generated from the first lens element can be corrected. The second lens element has an object-side surface being concave at a paraxial region thereof, and can have an image-side surface being convex or planar at a paraxial region thereof, so that the astigmatism of the optical photographing system can be corrected.

The third lens element can have positive refractive power for balancing the distribution of the positive refractive power of the first lens element, so that the sensitivity of the optical photographing system can be reduced. The third lens element can have an object-side surface and an image-side surface being both convex at a paraxial region thereof, so that the spherical aberration of the optical photographing system can be corrected.

The fourth lens element can have negative refractive power, and can have an object-side surface being concave at a paraxial region thereof and an image-side surface being convex at a paraxial region thereof. Therefore, the Petzval sum of the optical photographing system can be corrected effectively, so that the peripheral field of view can be better focused on the image plane with higher resolving power.

The fifth lens element with positive refractive power can have an object-side surface being concave at a paraxial region thereof, and has an image-side surface being convex at a paraxial region thereof. Therefore, the sensitivity of the optical photographing system can be reduced for increasing the manufacturing yield rate thereof, and the high order aberration of the optical photographing system can be corrected as well.

The sixth lens element can have negative refractive power, and can have an object-side surface being convex at a paraxial region thereof and has an image-side surface being concave at a paraxial region thereof. Therefore, the principal point of the optical photographing system can be positioned away from the image plane, and the back focal length thereof can be reduced so as to maintain the compact size of the optical photographing system. Furthermore, the image-side surface of the sixth lens element changes from concave at the paraxial region thereof to convex at a peripheral region thereof, so that the incident angle of the off-axis field on the image sensor can be effectively reduced for increasing the responding efficiency of the image sensor, and the aberration of the off-axis field can be further corrected.

When a curvature radius of the object-side surface of the second lens element is R3, and a curvature radius of the image-side surface of the second lens element is R4, the following relationship is satisfied:

$$-0.70 R3/|R4| \leq = 0.$$

Therefore, the refractive power of the second lens element can be controlled for maintaining the back focal length of the optical photographing system. As a result, the total track length of the optical photographing system can be reduced. Furthermore, the curvature of the surfaces of the second lens element is proper for correcting the aberration of the optical photographing system and reducing the sensitivity thereof. Consequently, the image quality is enhanced.

R3 and R4 can preferably satisfy the following relationship:

$$-0.45 < R3/|R4| \leq 0.$$

When a curvature radius of the object-side surface of the fourth lens element is R7, and a curvature radius of the image-side surface of the fourth lens element is R8, the following relationship is satisfied:

$$-0.40 < (R7-R8)/(R7+R8) < 0.30.$$

Therefore, the astigmatism of the optical photographing system can be corrected by adjusting the curvature of the surfaces of the fourth lens element.

When a focal length of the second lens element is f2, and the curvature radius of the image-side surface of the second lens element is R4, the following relationship is satisfied:

$$-0.1 < f2/R4 < 1$$

Therefore, the aberration of the optical photographing system can be corrected and the sensitivity thereof can be reduced for enhancing the image quality.

When a curvature radius of the object-side surface of the sixth lens element is R11, and a curvature radius of the image-side surface of the sixth lens element is R12, the following relationship is satisfied:

$$0 \leq R12/|R11| < 1.0$$

Therefore, the astigmatism of the optical photographing system can be corrected, and the principal point thereof can be positioned away from the image plane for reducing the back focal length, so that the compact size of the optical photographing system can be maintained.

When a central thickness of the third lens element is CT3, and a central thickness of the fourth lens element is CT4, the following relationship is satisfied:

$$0.30 < CT4/CT3 < 0.80.$$

Therefore, the thicknesses of the lens elements of the optical photographing system are proper for the manufacturing and the assembling of the lens elements, so that the production yield rate of the lens elements is improved.

When an axial distance between the object-side surface of the first lens element and the image plane is TTL, and a maximum image height of the optical photographing system is ImgH, the following relationship is satisfied:

$TTL/ImgH<1.8$

Therefore, the compact size of the optical photographing system can be maintained for applying to thin and portable electronics.

When an Abbe number of the first lens element is V1, and an Abbe number of the second lens element is V2, the following relationship is satisfied:

$0.2<V2/V1<0.6.$

Therefore, the chromatic aberration of the optical photographing system can be corrected.

When a minimum distance between a non-axial critical point on the image-side surface of the sixth lens element and an optical axis is Yc62, and a focal length of the optical photographing system is f, the following relationship is satisfied:

$0.10<Yc62/f<0.90.$

Therefore, the incident angle of the off-axis field on the image sensor can be effectively reduced for increasing the responding efficiency of the image sensor, and the aberration of the off-axis field can be further corrected.

When the focal length of the optical photographing system is f, and a focal length of the third lens element is f3, the following relationship is satisfied:

$0.3<f/f3<1.5$

Therefore, the distribution of the positive refractive power of the optical photographing system can be balanced for reducing the sensitivity thereof.

When a curvature radius of the object-side surface of the fifth lens element is R9, and a curvature radius of the image-side surface of the fifth lens element is R10, the following relationship is satisfied:

$0.10<(R9-R10)/(R9+R10)<0.70.$

Therefore, the astigmatism of the optical photographing system can be corrected by adjusting the curvature of the surfaces of the fifth lens element.

When a focal length of the first lens element is f1, and a focal length of the sixth lens element is f6, the following relationship is satisfied:

$-1.8<f1/f6<-0.9.$

Therefore, the principal point of the optical photographing system can be positioned away from the image plane for reducing the back focal length, so that the compact size of the optical photographing system can be maintained.

When a curvature radius of the image-side surface of the first lens element is R2, and the curvature radius of the object-side surface of the second lens element is R3, the following relationship is satisfied:

$-0.45<R3/R2<0.$

Therefore, the aberration of the optical photographing system can be corrected.

According to the optical photographing system of the present disclosure, the lens elements thereof can be made of plastic or glass material. When the lens elements are made of glass material, the distribution of the refractive power of the optical photographing system may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the optical photographing system can also be reduced.

According to the optical photographing system of the present disclosure, a critical point is a non-axial point of the lens surface where its tangent is perpendicular to the optical axis.

According to the optical photographing system of the present disclosure, each of the object-side surface and the image-side surface of every lens element has a paraxial region and a peripheral region. The paraxial region refers to the region of the surface where light rays travel close to an optical axis and the peripheral region refers to the region of the surface where light rays travel away from the optical axis.

According to the optical photographing system of the present disclosure, the optical photographing system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop disposed between an object and the first lens element provides a longer distance from an exit pupil of the system to the image plane and thereby the generated telecentric effect improves the image-sensing efficiency of the image sensor. A middle stop disposed between the first lens element and the image plane is favorable for enlarging the field of view of the optical photographing system and thereby provides a wider field of view for the same.

According to the optical photographing system of the present disclose, the optical photographing system is featured with a good correcting ability and high image quality, and can be applied to 3D (three-dimensional) image capturing applications, in products such as digital cameras, mobile devices and tablets.

According to the above description of the present disclosure, the following 1st-7th specific embodiments are provided for further explanation.

1st Embodiment

Figure 2:
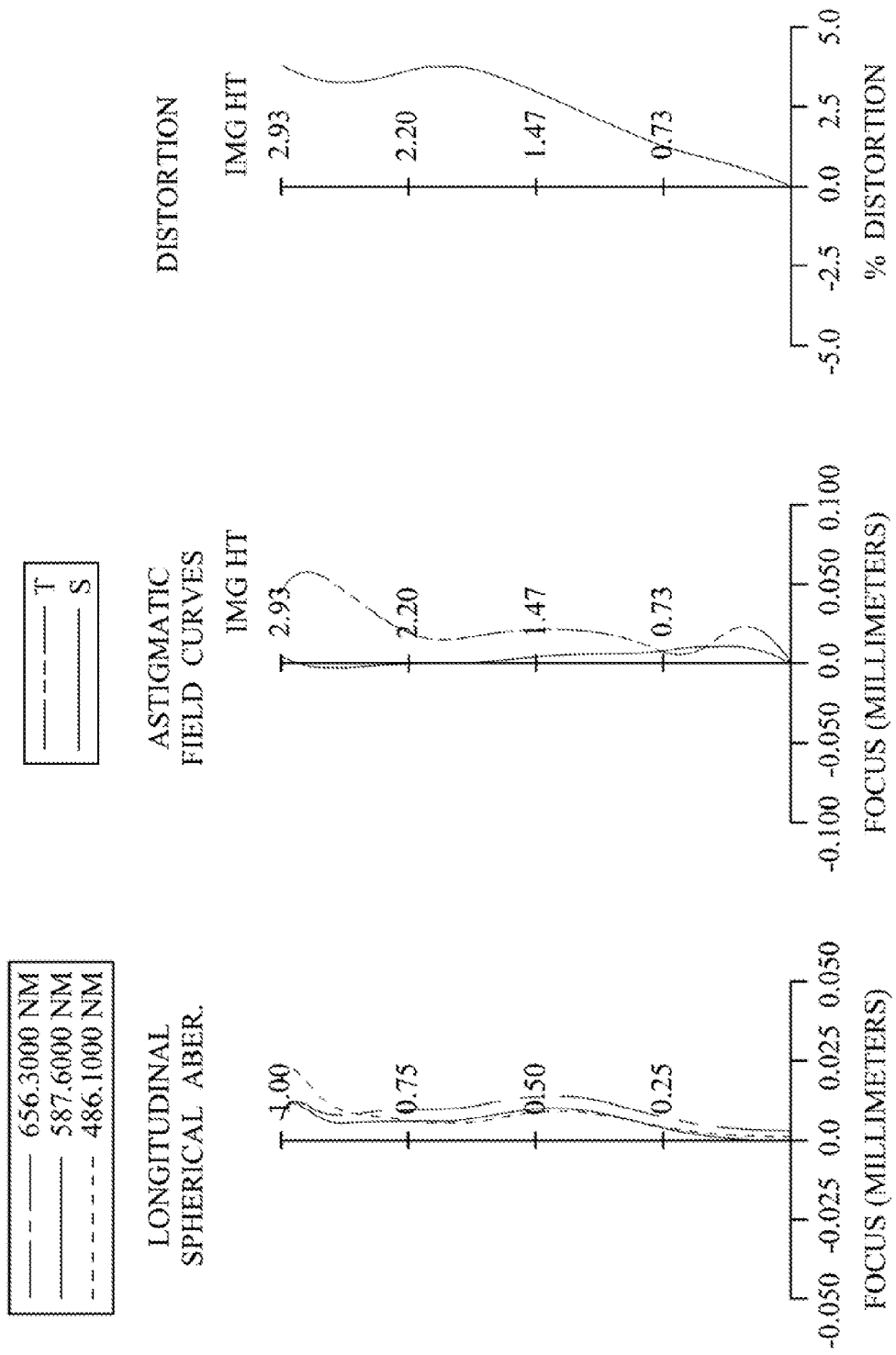
FIG. 2 shows spherical aberration curves, astigmatic field curves and a distortion curve of the optical photographing system according to the 1st embodiment.

FIG. 1 is a schematic view of an optical photographing system according to the 1st embodiment of the present disclosure. FIG. 2 shows spherical aberration curves, astigmatic field curves and a distortion curve of the optical photographing system according to the 1st embodiment. In FIG. 1, the optical photographing system includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170, and an image sensor 190.

The first lens element 110 with positive refractive power has an object-side surface 111 being convex at a paraxial region thereof and an image-side surface 112 being concave at a paraxial region thereof. The first lens element 110 is made of plastic material and has the object-side surface 111 and the image-side surface 112 being both aspheric.

The second lens element 120 with negative refractive power has an object-side surface 121 being concave at a paraxial region thereof and an image-side surface 122 being convex at a paraxial region thereof. The second lens element 120 is made of plastic material and has the object-side surface 121 and the image-side surface 122 being both aspheric.

The third lens element 130 with positive refractive power has an object-side surface 131 being convex at a paraxial region thereof and an image-side surface 132 being convex at a paraxial region thereof. The third lens element 130 is made of plastic material and has the object-side surface 131 and the image-side surface 132 being both aspheric.

The fourth lens element 140 with negative refractive power has an object-side surface 141 being concave at a paraxial region thereof and an image-side surface 142 being convex at a paraxial region thereof. The fourth lens element 140 is made of plastic material and has the object-side surface 141 and the image-side surface 142 being both aspheric.

The fifth lens element 150 with positive refractive power has an object-side surface 151 being concave at a paraxial region thereof and an image-side surface 152 being convex at a paraxial region thereof. The fifth lens element 150 is made of plastic material and has the object-side surface 151 and the image-side surface 152 being both aspheric.

The sixth lens element 160 with negative refractive power has an object-side surface 161 being convex at a paraxial region thereof and an image-side surface 162 changing from concave at a paraxial region thereof to convex at a peripheral region thereof. The sixth lens element 160 is made of plastic material and has the object-side surface 161 and the image-side surface 162 being both aspheric.

The IR-cut filter 180 made of glass material is located between the sixth lens element 160 and the image plane 170, and will not affect a focal length of the optical photographing system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical photographing system according to the 1st embodiment, when the focal length of the optical photographing system is f, an f-number of the optical photographing system is Fno, and half of a maximal field of view of the optical photographing system is HFOV, these parameters have the following values:

$f=3.71$ mm;

$Fno=2.25$; and $HFOV=37.3$ degrees.

In the optical photographing system according to the 1st embodiment, when an Abbe number of the first lens element 110 is V1, and an Abbe number of the second lens element 120 is V2, the following relationship is satisfied:

$V2/V1=0.38$.

In the optical photographing system according to the 1st embodiment, when a central thickness of the third lens element 130 is CT3, and a central thickness of the fourth lens element 140 is CT4, the following relationship is satisfied:

$CT4/CT3=0.63$.

In the optical photographing system according to the 1st embodiment, when a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following relationships are satisfied:

$R3/R2=-0.25$;

$R3/|R4|=-0.37$;

$(R7-R8)/(R7+R8)=-0.27$;

$(R9-R10)/(R9+R10)=0.29$; and $R12/|R11|=0.29$.

In the optical photographing system according to the 1st embodiment, when the focal length of the optical photographing system is f, a focal length of the first lens element 110 is f1, a focal length of the second lens element 120 is f2, a focal length of the third lens element 130 is f3, a focal length of the sixth lens element 160 is f6, and the curvature radius of the image-side surface 122 of the second lens element 120 is R4, the following relationships are satisfied:

$f2/R4=0.91$;

$f1/f6=-1.38$; and $f/f3=1.01$.

Figure 15:
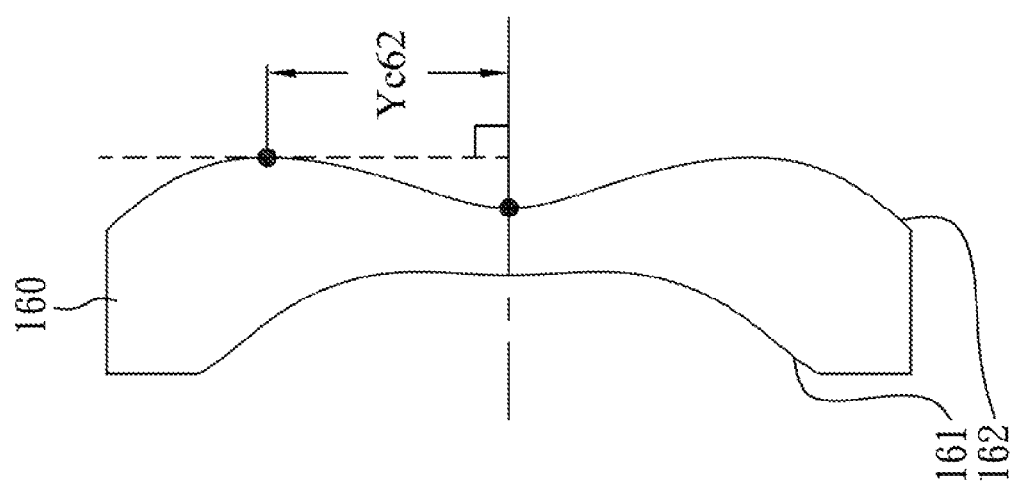
FIG. 15 shows Yc62 of the sixth lens element of the optical photographing system as illustrated in FIG. 1.

FIG. 15 shows Yc62 of the sixth lens element 160 of the optical photographing system as illustrated in FIG. 1. In FIG. 15, when a minimum distance between a non-axial critical point on the image-side surface 162 of the sixth lens element 160 and an optical axis is Yc62, and the focal length of the optical photographing system is f, the following relationship is satisfied:

$Yc62/f=0.38$.

In the optical photographing system according to the 1st embodiment, when an axial distance between the object-side surface 111 of the first lens element 110 and the image plane 170 is TTL, and a maximum image height of the optical photographing system is ImgH which here is a half of the diagonal length of the photosensitive area of the image sensor 190 on the image plane to 170, the following relationship is satisfied:

$TTL/\text{ImgH}=1.61$.

The detailed optical data of the 1st embodiment are shown in Table 1, and the aspheric surface data are shown in Table 2 below.

TABLE 1

1st Embodiment
f = 3.71 mm, Fno = 2.25, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.238 | | | | |
| 2 | Lens 1 | 1.529 (ASP) | 0.461 | Plastic | 1.535 | 55.7 | 3.35 |
| 3 | | 9.341 (ASP) | 0.290 | | | | |
| 4 | Lens 2 | −2.295 (ASP) | 0.220 | Plastic | 1.650 | 21.4 | −5.71 |
| 5 | | −6.250 (ASP) | 0.159 | | | | |
| 6 | Lens 3 | 5.003 (ASP) | 0.526 | Plastic | 1.544 | 55.9 | 3.68 |
| 7 | | −3.212 (ASP) | 0.050 | | | | |
| 8 | Lens 4 | −2.205 (ASP) | 0.333 | Plastic | 1.583 | 30.2 | −9.59 |
| 9 | | −3.843 (ASP) | 0.371 | | | | |
| 10 | Lens 5 | −1.890 (ASP) | 0.622 | Plastic | 1.544 | 55.9 | 3.44 |
| 11 | | −1.050 (ASP) | 0.262 | | | | |
| 12 | Lens 6 | 2.935 (ASP) | 0.392 | Plastic | 1.535 | 56.3 | −2.43 |
| 13 | | 0.859 (ASP) | 0.500 | | | | |
| 14 | IR-cut filter | Plano | 0.210 | Glass | 1.517 | 64.2 | — |
| 15 | | Plano | 0.404 | | | | |
| 16 | Image | Plano | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | −1.5750E−01 | −4.8016E+01 | −2.8477E+00 | −1.3326E+01 | −8.5059E+00 | 1.0000E+00 |
| A4 = | 1.9960E−02 | 3.2544E−03 | 1.4987E−02 | −8.2010E−02 | −2.6039E−01 | −1.5830E−01 |
| A6 = | −1.4386E−02 | 6.0913E−02 | 2.4403E−01 | 4.5737E−01 | 2.6285E−01 | −1.7026E−02 |
| A8 = | 2.3553E−01 | −3.4095E−01 | −1.0125E+00 | −1.0590E+00 | −5.1448E−01 | −2.8158E−03 |
| A10 = | −7.4484E−01 | 7.2672E−01 | 2.1676E+00 | 1.7537E+00 | 6.1191E−01 | 3.0994E−03 |
| A12 = | 1.0950E+00 | −8.8679E−01 | −2.6885E+00 | −1.7176E+00 | −4.7903E−01 | 3.3054E−03 |
| A14 = | −6.4752E−01 | 2.6609E−01 | 1.2648E+00 | 7.3833E−01 | 1.5915E−01 | |

| Surface # | 8 | 9 | 10 | 11 | 12 | 13 |
|---|---|---|---|---|---|---|
| k = | −2.2055E+00 | −3.8432E+00 | −1.8903E+00 | −1.0496E+00 | −9.0000E+01 | −4.8322E+00 |
| A4 = | 9.4198E−01 | 1.0000E+00 | 1.5230E−01 | −1.0187E+00 | −1.3633E−01 | −1.3124E−01 |
| A6 = | −4.0100E−02 | −2.4999E−02 | −3.9178E−02 | 1.2287E−01 | −1.0092E−01 | 6.6515E−02 |
| A8 = | 7.2713E−03 | −2.2319E−02 | −1.5223E−01 | −2.0354E−01 | 2.0701E−01 | −2.1744E−02 |
| A10 = | −2.0854E−02 | 1.0182E−02 | −1.0526E−01 | 1.0526E−01 | −1.4172E−01 | 4.0807E−03 |
| A12 = | 1.8510E−02 | 4.0892E−03 | 2.6705E−01 | 1.6636E−02 | 4.7802E−02 | −4.5954E−04 |
| A14 = | 1.2352E−03 | 6.4724E−04 | −17455E−01 | −2.0097E−02 | −7.8851E−03 | 3.0265E−05 |
| A16 = | | | 3.3358E−02 | 3.2660E−03 | 5.0860E−04 | −8.8517E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an to explanation in this regard will not be provided again.

2nd Embodiment

Figure 3:
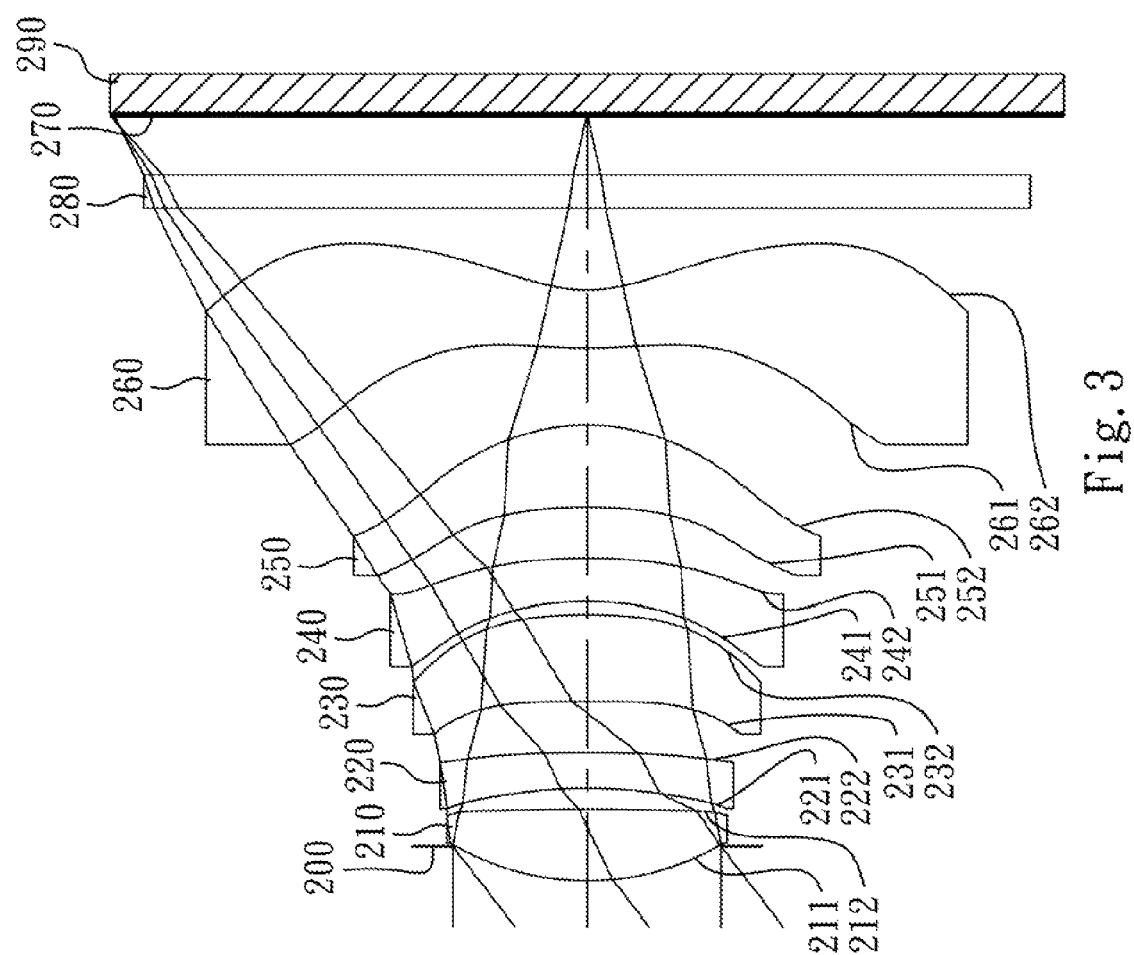
FIG. 3 is a schematic view of an optical photographing system according to the 2nd embodiment of the present disclosure.
Figure 4:
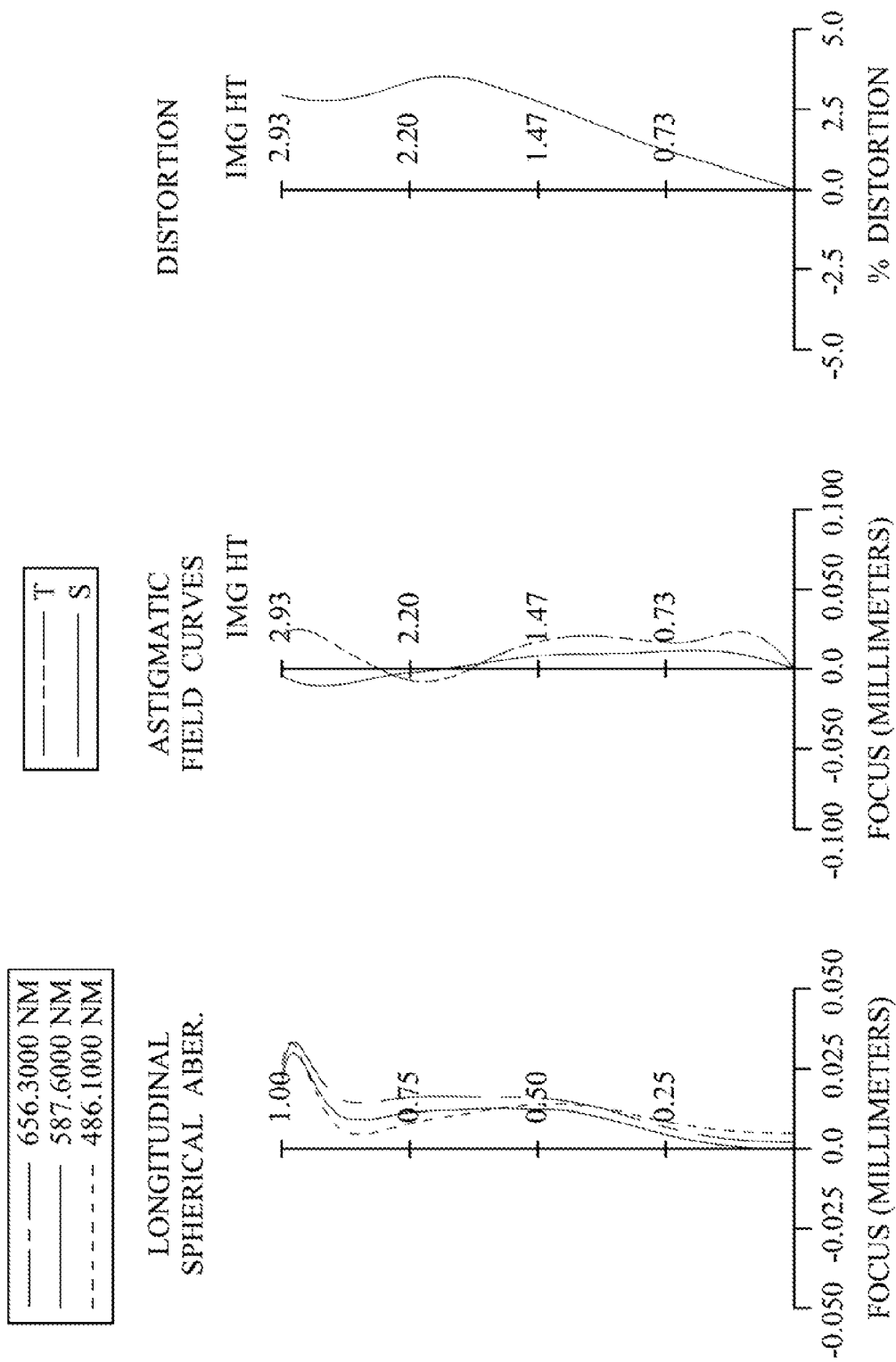
FIG. 4 shows spherical aberration curves, astigmatic field curves and a distortion curve of the optical photographing system according to the 2nd embodiment.

FIG. 3 is a schematic view of an optical photographing system according to the 2nd embodiment of the present disclosure. FIG. 4 shows spherical aberration curves, astigmatic field curves and a distortion curve of the optical photographing system according to the 2nd embodiment. In FIG. 3, the optical photographing system includes, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270, and an image sensor 290.

The first lens element 210 with positive refractive power has an object-side surface 211 being convex at a paraxial region thereof and an image-side surface 212 being convex at a paraxial region thereof. The first lens element 210 is made of plastic material and has the object-side surface 211 and the image-side surface 212 being both aspheric.

The second lens element 220 with negative refractive power has an object-side surface 221 being concave at a paraxial region thereof and an image-side surface 222 being convex at a paraxial region thereof. The second lens element 220 is made of plastic material and has the object-side surface 221 and the image-side surface 222 being both aspheric.

The third lens element 230 with positive refractive power has an object-side surface 231 being concave at a paraxial region thereof and an image-side surface 232 being convex at a paraxial region thereof. The third lens element 230 is made of plastic material and has the object-side surface 231 and the image-side surface 232 being both aspheric.

The fourth lens element 240 with negative refractive power has an object-side surface 241 being concave at a paraxial region thereof and an image-side surface 242 being convex at a paraxial region thereof. The fourth lens element 240 is made of plastic material and has the object-side surface 241 and the image-side surface 242 being both aspheric.

The fifth lens element 250 with positive refractive power has an object-side surface 251 being concave at a paraxial region thereof and an image-side surface 252 being convex at a paraxial region thereof. The fifth lens element 250 is made of plastic material and has the object-side surface 251 and the image-side surface 252 being both aspheric.

The sixth lens element 260 with negative refractive power has an object-side surface 261 being convex at a paraxial region thereof and an image-side surface 262 changing from concave at a paraxial region thereof to convex at a peripheral region thereof. The sixth lens element 260 is made of plastic material and has the object-side surface 261 and the image-side surface 262 being both aspheric.

The IR-cut filter 280 made of glass material is located between the sixth lens element 260 and the image plane 270, and will not affect a focal length of the optical photographing system.

The detailed optical data, of the 2nd embodiment are shown in Table 3, and the aspheric surface data are shown in Table 4 below.

TABLE 3

2nd Embodiment
f = 3.72 mm, Fno = 2.25, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.213 | | | | |
| 2 | Lens 1 | 1.666 (ASP) | 0.442 | Plastic | 1.535 | 55.7 | 2.83 |
| 3 | | −15.210 (ASP) | 0.129 | | | | |
| 4 | Lens 2 | −2.956 (ASP) | 0.220 | Plastic | 1.650 | 21.4 | −6.48 |
| 5 | | −10.204 (ASP) | 0.312 | | | | |
| 6 | Lens 3 | −46.170 (ASP) | 0.539 | Plastic | 1.544 | 55.9 | 6.56 |
| 7 | | −3.325 (ASP) | 0.081 | | | | |
| 8 | Lens 4 | −1.960 (ASP) | 0.288 | Plastic | 1.607 | 26.6 | −8.55 |
| 9 | | −3.310 (ASP) | 0.316 | | | | |
| 10 | Lens 5 | −2.912 (ASP) | 0.507 | Plastic | 1.514 | 56.8 | 3.67 |
| 11 | | −1.212 (ASP) | 0.471 | | | | |
| 12 | Lens 6 | 3.066 (ASP) | 0.363 | Plastic | 1.535 | 55.7 | −2.64 |
| 13 | | 0.927 (ASP) | 0.500 | | | | |
| 14 | IR-cut filter | Plano | 0.210 | Glass | 1.517 | 64.2 | — |
| 15 | | Plano | 0.370 | | | | |
| 16 | Image | Plano | — | | | | |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k = | −2.6988E−01 | −1.0494E+01 | −1.4756E+00 | −4.7491E+01 | −8.6090E+00 | 6.2726E−01 |
| A4 = | 1.3393E−02 | 2.7056E−03 | 5.1251E−04 | −9.5497E−02 | −2.6447E−01 | −2.0229E−01 |
| A6 = | −7.4996E−03 | 1.1041E−01 | 2.8409E−01 | 3.3029E−01 | 1.4357E−01 | −5.5400E−03 |
| A8 = | 2.1910E−01 | −3.3122E−01 | −1.0427E+00 | −1.0013E+00 | −3.9333E−01 | 1.7919E−02 |
| A10 = | −7.2435E−01 | 6.8368E−01 | 2.1755E+00 | 1.7500E+00 | 5.9034E−01 | −9.0983E−04 |
| A12 = | 1.0907E+00 | −8.8679E−01 | −2.6764E+00 | −1.7086E+00 | −4.6913E−01 | 3.5567E−03 |
| A14 = | −6.4752E−01 | 2.6609E−01 | 1.2648E+00 | 7.3833E−01 | 1.5915E−01 | |

| Surface # | 8 | 9 | 10 | 11 | 12 | 13 |
|---|---|---|---|---|---|---|
| k = | 7.9488E−01 | 8.3714E−01 | 5.3290E−01 | −1.0882E+00 | −8.4276E+01 | −4.6746E+00 |
| A4 = | −5.0235E−02 | −2.4964E−02 | −4.1819E−02 | 9.3984E−02 | −1.4456E−01 | −1.3595E−01 |
| A6 = | 6.3794E−03 | −2.9641E−02 | −1.6336E−01 | −1.9768E−01 | −9.8602E−02 | 6.8686E−02 |
| A8 = | −3.8219E−02 | 1.8632E−02 | −1.7029E−02 | 1.0567E−01 | 2.0749E−01 | −2.2050E−02 |
| A10 = | 1.4490E−02 | 8.0099E−03 | 2.6480E−01 | 1.6572E−02 | −1.4177E−01 | 4.0874E−03 |
| A12 = | 2.1171E−02 | 2.2697E−03 | −1.7370E−01 | −2.0254E−02 | 4.7774E−02 | −4.5961E−04 |
| A14 = | | | 3.3823E−02 | 3.1795E−03 | −7.8985E−03 | 3.0240E−05 |
| A16 = | | | | | 5.1220E−04 | −8.5902E−07 |

In the optical photographing system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f (mm) | 3.72 | (R9 − R10)/(R9 + R10) | 0.41 |
|---|---|---|---|
| Fno | 2.25 | R12/|R11| | 0.30 |
| HFOV (deg.) | 37.4 | f2/R4 | 0.64 |
| V2/V1 | 0.38 | f1/f6 | −1.07 |
| CT4/CT3 | 0.50 | f/f3 | 0.57 |
| R3/R2 | 0.19 | Yc62/f | 0.38 |
| R3/|R4| | −0.29 | TTL/ImgH | 1.59 |
| (R7 − R8)/(R7 + R8) | −0.26 | | |

3rd Embodiment

Figure 5:
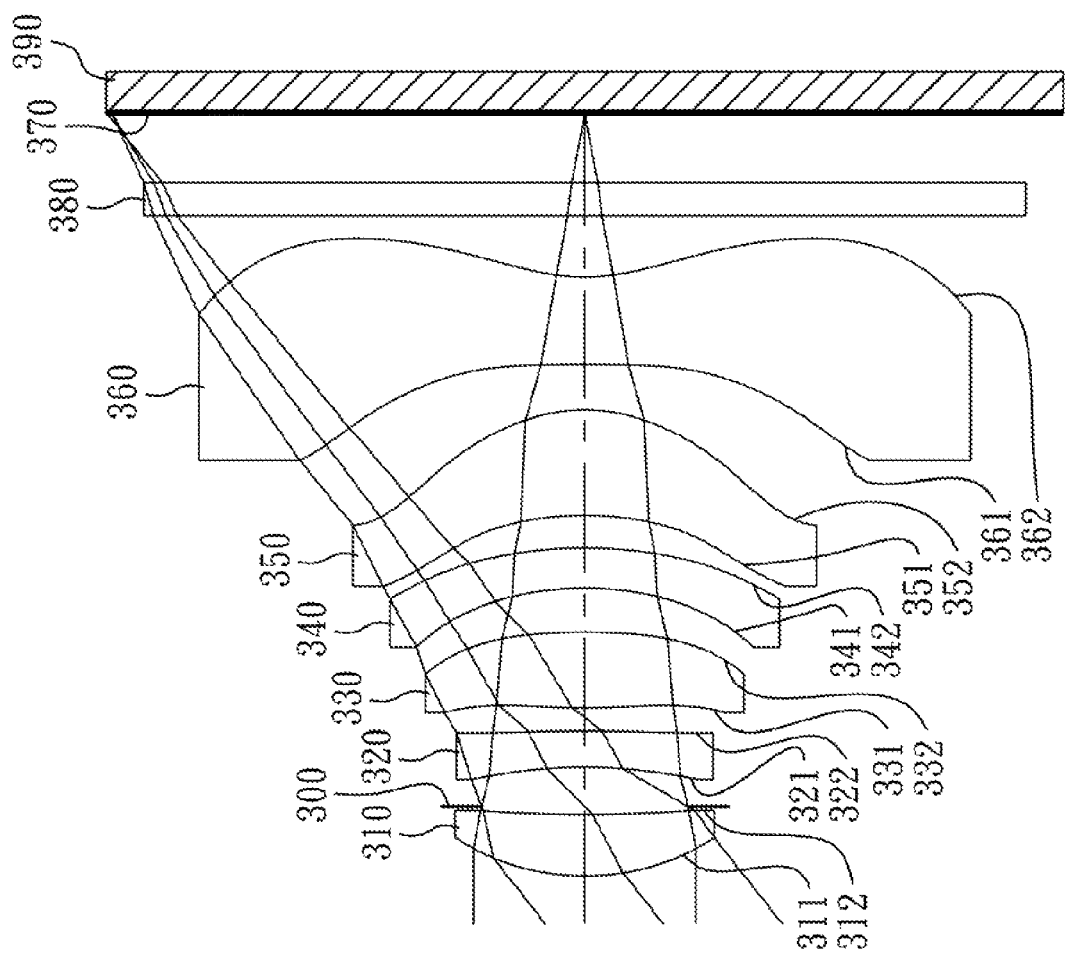
FIG. 5 is a schematic view of an optical photographing system according to the 3rd embodiment of the present disclosure.
Figure 6:
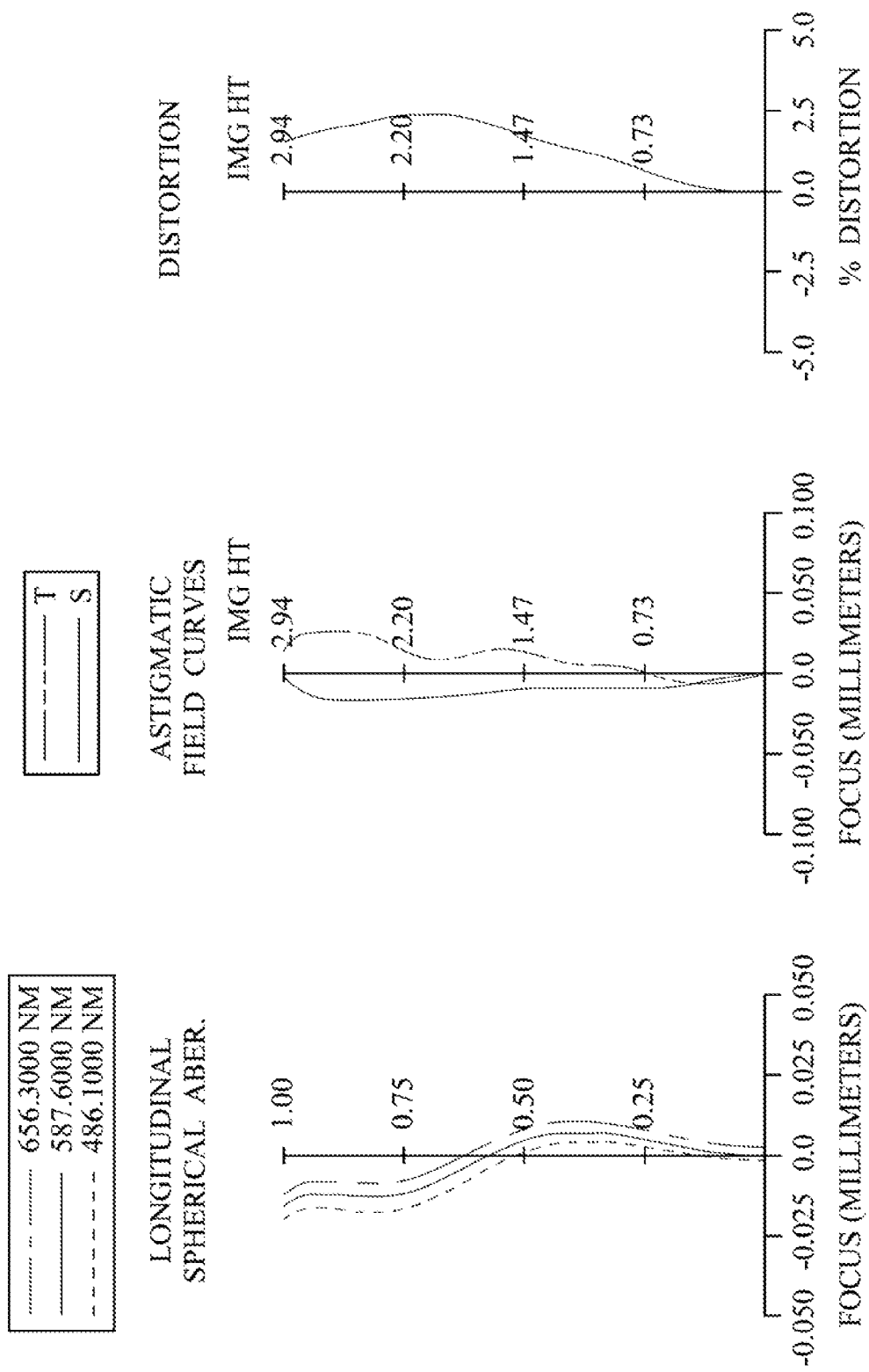
FIG. 6 shows spherical aberration curves, astigmatic field curves and a distortion curve of the optical photographing system according to the 3rd embodiment.

FIG. 5 is a schematic view of an optical photographing system according to the 3rd embodiment of the present disclosure. FIG. 6 shows spherical aberration curves, astigmatic field curves and a distortion curve of the optical photographing system according to the 3rd embodiment. In FIG. 5, the optical photographing system includes, in order from an object side to an image side, a first lens element 310, an aperture stop 300, a second lens element 320, a third lens element 330, a fourth lens element 340, a fifth lens element 350, a sixth lens element 360, an IR-cut filter 380, an image plane 370, and an image sensor 390.

The first lens element 310 with positive refractive power has an object-side surface 311 being convex at a paraxial region thereof and an image-side surface 312 being concave at a paraxial region thereof. The first lens element 310 is made of plastic material and has the object-side surface 311 and the image-side surface 312 being both aspheric.

The second lens element 320 with negative refractive power has an object-side surface 321 being concave at a paraxial region thereof and an image-side surface 322 being convex at a paraxial region thereof. The second lens element 320 is made of plastic material and has the object-side surface 321 and the image-side surface 322 being both aspheric.

The third lens element 330 with positive refractive power has an object-side surface 331 being convex at a paraxial region thereof and an image-side surface 332 being convex at a paraxial region thereof. The third lens element 330 is made of plastic material and has the object-side surface 331 and the image-side surface 332 being both aspheric.

The fourth lens element 340 with negative refractive power has an object-side surface 341 being concave at a paraxial region thereof and an image-side surface 342 being convex at a paraxial region thereof. The fourth lens element 340 is made of plastic material and has the object-side surface 341 and the image-side surface 342 being both aspheric.

The fifth lens element 350 with positive refractive power has an object-side surface 351 being concave at a paraxial region thereof and an image-side surface 352 being convex at a paraxial region thereof. The fifth lens element 350 is made of plastic material and has the object-side surface 351 and the image-side surface 352 being both aspheric.

The sixth lens element 360 with negative refractive power has an object-side surface 361 being concave at a paraxial region thereof and an image-side surface 362 changing from concave at a paraxial region thereof to convex at a peripheral region thereof. The sixth lens element 360 is made of plastic material and has the object-side surface 361 and the image-side surface 362 being both aspheric.

The IR-cut filter no made of glass material is located between the sixth lens element 360 and the image plane 370, and will not affect a focal length of the optical photographing system.

The detailed optical data of the 3rd embodiment are shown in Table 5, and the aspheric surface data are shown in Table 6 below.

TABLE 5

3rd Embodiment
f = 3.71 mm, Fno = 2.70, HFOV = 37.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.523 (ASP) | 0.382 | Plastic | 1.530 | 55.8 | 3.31 |
| 2 | | 10.616 (ASP) | 0.048 | | | | |
| 3 | Ape. Stop | Plano | 0.245 | | | | |
| 4 | Lens 2 | −2.808 (ASP) | 0.220 | Plastic | 1.634 | 23.8 | −5.22 |
| 5 | | −19.034 (ASP) | 0.144 | | | | |
| 6 | Lens 3 | 4.645 (ASP) | 0.472 | Plastic | 1.544 | 55.9 | 4.10 |
| 7 | | −4.142 (ASP) | 0.269 | | | | |
| 8 | Lens 4 | −1.976 (ASP) | 0.252 | Plastic | 1.632 | 23.4 | −12.16 |
| 9 | | −2.791 (ASP) | 0.202 | | | | |
| 10 | Lens 5 | −2.080 (ASP) | 0.654 | Plastic | 1.544 | 55.9 | 2.98 |
| 11 | | −1.012 (ASP) | 0.280 | | | | |
| 12 | Lens 6 | −25.003 (ASP) | 0.543 | Plastic | 1.535 | 56.3 | −2.14 |
| 13 | | 1.206 (ASP) | 0.375 | | | | |
| 14 | IR-cut filter | Plano | 0.210 | Glass | 1.517 | 64.2 | — |
| 15 | | Plano | 0.433 | | | | |
| 16 | Image | Plano | — | | | | |

Note:
Reference wavelength (d-line) is 587.6 nm.

TABLE 6

Aspheric Coefficients

| Surface # | 1 | 2 | 4 | 5 | 6 | 7 |
|---|---|---|---|---|---|---|
| k = | −4.4999E−02 | 3.3449E+01 | −6.0813E+00 | −8.2563E+01 | −4.8069E+00 | 9.9901E−01 |
| A4 = | 1.2462E−02 | 1.4541E−02 | 2.5448E−02 | −6.9785E−02 | −2.5804E−01 | −1.2843E−01 |
| A6 = | 4.4870E−02 | 3.6855E−02 | 2.0223E−01 | 4.3277E−01 | 2.6694E−01 | −2.2757E−02 |
| A8 = | 6.2080E−02 | −2.5342E−01 | −1.0118E+00 | −1.1137E+00 | −5.1851E−01 | 5.1561E−03 |
| A10 = | −4.9204E−01 | 8.3227E−01 | 2.1708E+00 | 1.8161E+00 | 6.3836E−01 | −6.5934E−03 |
| A12 = | 9.3704E−01 | −8.8600E−01 | −2.6876E+00 | −1.7292E+00 | −4.7903E−01 | 3.3610E−03 |
| A14 = | −6.4706E−01 | 2.6495E−01 | 1.2660E+00 | 7.3734E−01 | 1.5915E−01 | |

| Surface # | 8 | 9 | 10 | 11 | 12 | 13 |
|---|---|---|---|---|---|---|
| k = | 2.8568E−01 | 1.0000E+00 | 1.3978E−01 | −1.0328E+00 | −1.3430E+00 | −4.9712E+00 |
| A4 = | −2.5293E−02 | −8.0331E−03 | −3.2693E−02 | 1.2524E−01 | −1.1694E−01 | −1.2895E−01 |
| A6 = | 1.2208E−02 | −1.8291E−02 | −1.4005E−01 | −2.0718E−01 | −1.0246E−01 | 6.5435E−02 |
| A8 = | −3.2336E−02 | 6.0118E−03 | −9.2769E−03 | 1.0674E−01 | 2.0723E−01 | −2.1345E−02 |
| A10 = | | 4.2917E−03 | 2.6352E−01 | 1.8421E−02 | −1.4159E−01 | 4.0806E−03 |
| A12 = | | −1.0372E−03 | −1.7752E−01 | −1.9293E−02 | 4.7816E−02 | −4.6359E−04 |
| A14 = | | | 3.4313E−02 | 2.7669E−03 | −7.8968E−03 | 2.8672E−05 |
| A16 = | | | | | 5.0764E−04 | −7.3147E−07 |

In the optical photographing system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.71 | (R9 − R10)/(R9 + R10) | 0.35 |
| Fno | 2.70 | R12/|R11| | 0.05 |
| HFOV (deg.) | 37.9 | f2/R4 | 0.27 |
| V2/V1 | 0.43 | f1/f6 | −1.55 |
| CT4/CT3 | 0.53 | f/f3 | 0.91 |
| R3/R2 | −0.26 | Yc62/f | 0.38 |
| R3/|R4| | −0.15 | TTL/ImgH | 1.59 |
| (R7 − R8)/(R7 + R8) | −0.17 | | |

4th Embodiment

Figure 7:
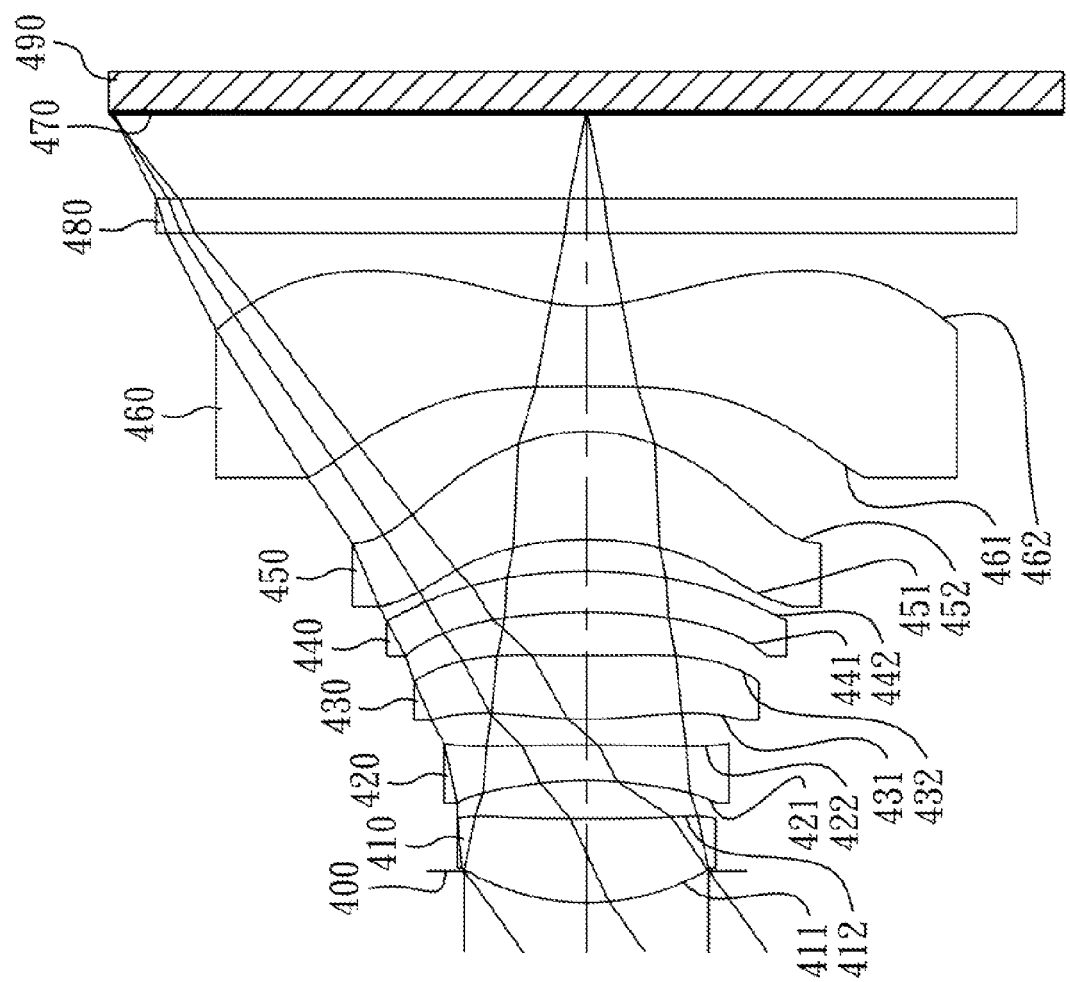
FIG. 7 is a schematic view of an optical photographing system according to the 4th embodiment of the present disclosure.
Figure 8:
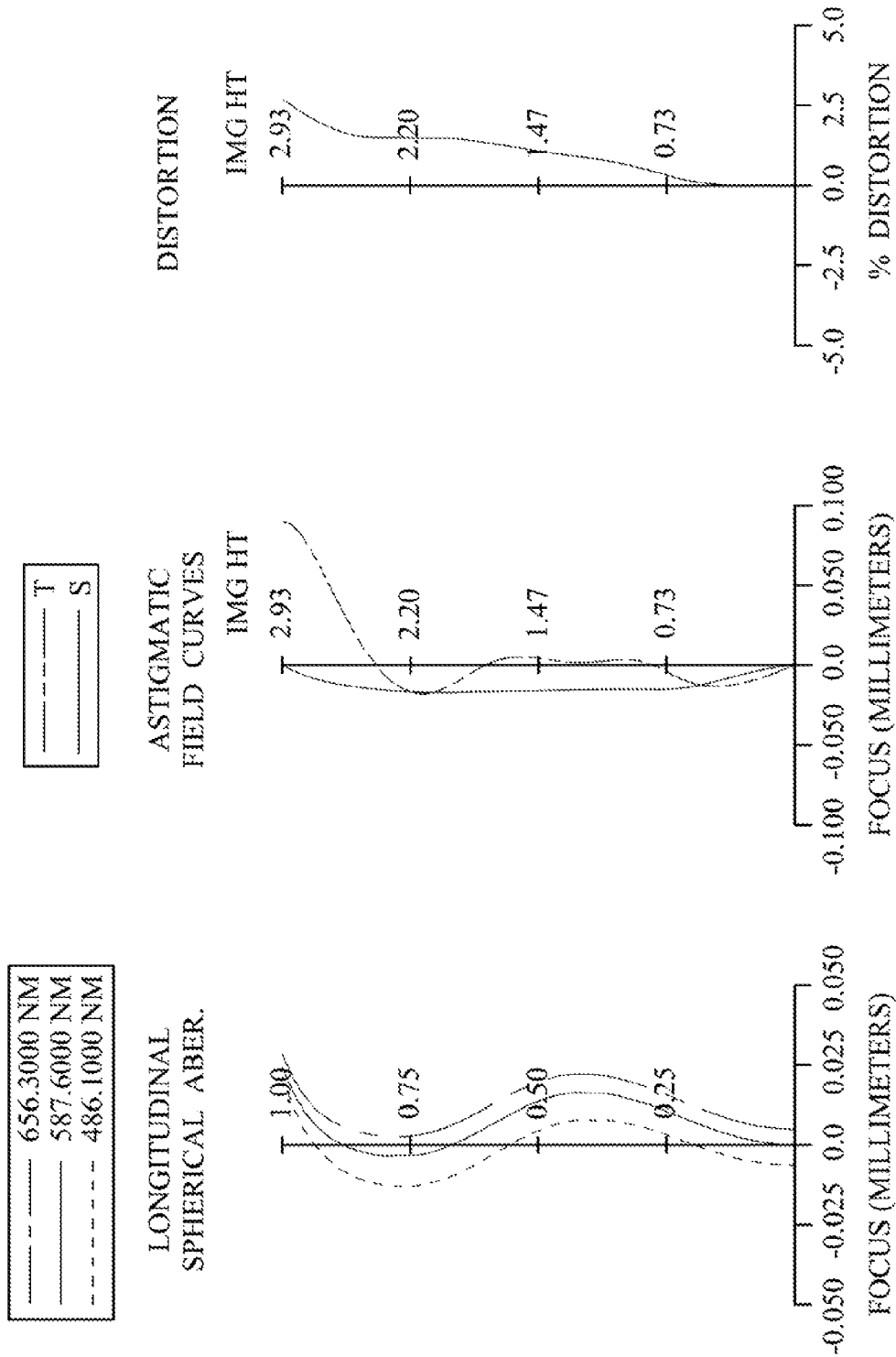
FIG. 8 shows spherical aberration curves, astigmatic field curves and a distortion curve of the optical photographing system according to the 4th embodiment.

FIG. 7 is a schematic view of an optical photographing system according to the 4th embodiment of the present disclosure. FIG. 8 shows spherical aberration curves, astigmatic field curves and a distortion curve of the optical photographing system according to the 4th embodiment. In FIG. 7, the optical photographing system includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470, and an image sensor 490.

The first lens element 410 with positive refractive power has an object-side surface 411 being convex at a paraxial region thereof and an image-side surface 412 being concave at a paraxial region thereof. The first lens element 410 is made of plastic material and has the object-side surface 411 and the image-side surface 412 being both aspheric.

The second lens element 420 with negative refractive power has an object-side surface 421 being concave at a paraxial region thereof and an image-side surface 422 being convex at a paraxial region thereof. The second lens element 420 is made of plastic material and has the object-side surface 421 and the image-side surface 422 being both aspheric.

The third lens element 430 with positive refractive power has an object-side surface 431 being convex at a paraxial region thereof and an image-side surface 432 being concave at a paraxial region thereof. The third lens element 430 is made of plastic material and has the object-side surface 431 and the image-side surface 432 being both aspheric.

The fourth lens element 440 with positive refractive power has an object-side surface 441 being concave at a paraxial region thereof and an image-side surface 442 being convex at a paraxial region thereof. The fourth) lens element 440 is made of plastic material and has the object-side surface 441 and the image-side surface 442 being both aspheric.

The fifth lens element 450 with positive refractive power has an object-side surface 451 being concave at a paraxial region thereof and an image-side surface 452 being convex at a paraxial region thereof. The fifth lens element 450 is made of plastic material and has the object-side surface 451 and the image-side surface 452 being both aspheric.

The sixth lens element 460 with negative refractive power has an object-side surface 461 being concave at a paraxial region thereof and an image-side surface 462 changing from concave at a paraxial region thereof to convex at a peripheral region thereof. The sixth lens element 460 is made of plastic material and has the object-side surface 461 and the image-side surface 462 being both aspheric.

The IR-cut filter 480 made of glass material is located between the sixth lens element 460 and the image plane 470, and will not affect a focal length of the optical photographing system.

The detailed optical data of the 4th embodiment are shown in Table 7, and the aspheric surface data are shown in Table 8 below.

TABLE 7

4th Embodiment
f = 3.93 mm, Fno = 2.60, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.197 | | | | |
| 2 | Lens 1 | 1.523 (ASP) | 0.523 | Plastic | 1.530 | 55.8 | 3.19 |
| 3 | | 13.462 (ASP) | 0.236 | | | | |
| 4 | Lens 2 | −2.409 (ASP) | 0.220 | Plastic | 1.634 | 23.8 | −4.14 |
| 5 | | −30.498 (ASP) | 0.157 | | | | |
| 6 | Lens 3 | 2.842 (ASP) | 0.398 | Plastic | 1.530 | 55.8 | 6.30 |
| 7 | | 18.210 (ASP) | 0.267 | | | | |
| 8 | Lens 4 | −3.765 (ASP) | 0.250 | Plastic | 1.607 | 26.6 | 22.01 |
| 9 | | −3.012 (ASP) | 0.200 | | | | |
| 10 | Lens 5 | −2.153 (ASP) | 0.669 | Plastic | 1.544 | 55.9 | 3.10 |
| 11 | | −1.050 (ASP) | 0.280 | | | | |
| 12 | Lens 6 | −21.235 (ASP) | 0.498 | Plastic | 1.530 | 55.8 | −2.19 |
| 13 | | 1237 (ASP) | 0.450 | | | | |
| 14 | IR-cut filter | Plano | 0.210 | Glass | 1.517 | 64.2 | — |
| 15 | | Plano | 0.536 | | | | |
| 16 | Image | Plano | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | −7.2819E−02 | −1.1596E+01 | −5.0550E+00 | −5.7864E+01 | −5.4221E+00 | −7.3665E+00 |
| A4 = | 1.0833E−02 | 1.1475E−02 | 2.0648E−02 | −6.6000E−02 | −2.5790E−01 | −1.2822E−01 |
| A6 = | 4.5298E−02 | 2.5130E−02 | 1.9405E−01 | 4.3236E−01 | 2.7373E−01 | −2.3010E−02 |
| A8 = | 6.3520E−02 | −2.7641E−01 | −1.0341E+00 | −1.1149E+00 | −5.1171E−01 | 4.4093E−03 |
| A10 = | −5.0144E−01 | 5.8806E−01 | 2.0950E+00 | 1.8265E+00 | 6.3956E−01 | −6.0622E−03 |
| A12 = | 9.6303E−01 | −8.8593E−01 | −2.6877E+00 | −1.7290E+00 | −4.7914E−01 | 4.8964E−03 |
| A14 = | −6.4711E−01 | 2.6496E−01 | 1.2660E+00 | 7.3736E−01 | 1.5910E−01 | |

| Surface # | 8 | 9 | 10 | 11 | 12 | 13 |
|---|---|---|---|---|---|---|
| k = | 4.0340E−01 | 8.4992E−01 | 8.9072E−02 | −1.0252E+00 | −1.9919E+01 | −5.3303E+00 |
| A4 = | −2.6624E−02 | −6.9092E−03 | −3.1298E−02 | 1.2439E−01 | −1.1587E−01 | −1.2943E−01 |
| A6 = | 1.1191E−02 | −1.7384E−02 | −1.3931E−01 | −2.0748E−01 | −1.0222E−01 | 6.4972E−G2 |
| A8 = | −3.2403E−02 | 6.3442E−03 | −8.8037E−03 | 1.0667E−01 | 2.0726E−01 | −2.1353E−02 |
| A10 = | | 4.1371E−03 | 2.6398E−01 | 1.8393E−02 | −1.4159E−01 | 4.0942E−03 |
| A12 = | | −1.3386E−03 | −1.7738E−01 | −1.9302E−02 | 4.7814E−02 | −4.6248E−04 |
| A14 = | | | 3.4314E−02 | 2.7670E−03 | −7.8968E−03 | 2.8781E−05 |
| A16 = | | | | | 5.0730E−04 | −7.3976E−07 |

In the optical photographing system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.93 | (R9 − R10)/(R9 + R10) | 0.34 |
| Fno | 2.60 | R12/|R11| | 0.06 |
| HFOV (deg.) | 36.0 | f2/R4 | 0.14 |
| V2/V1 | 0.43 | f1/f6 | −1.46 |
| CT4/CT3 | 0.63 | f/f3 | 0.62 |
| R3/R2 | −0.18 | Yc62/f | 0.34 |
| R3/|R4| | −0.08 | TTL/ImgH | 1.64 |
| (R7 − R8)/(R7 + R8) | 0.11 | | |

5th Embodiment

Figure 9:
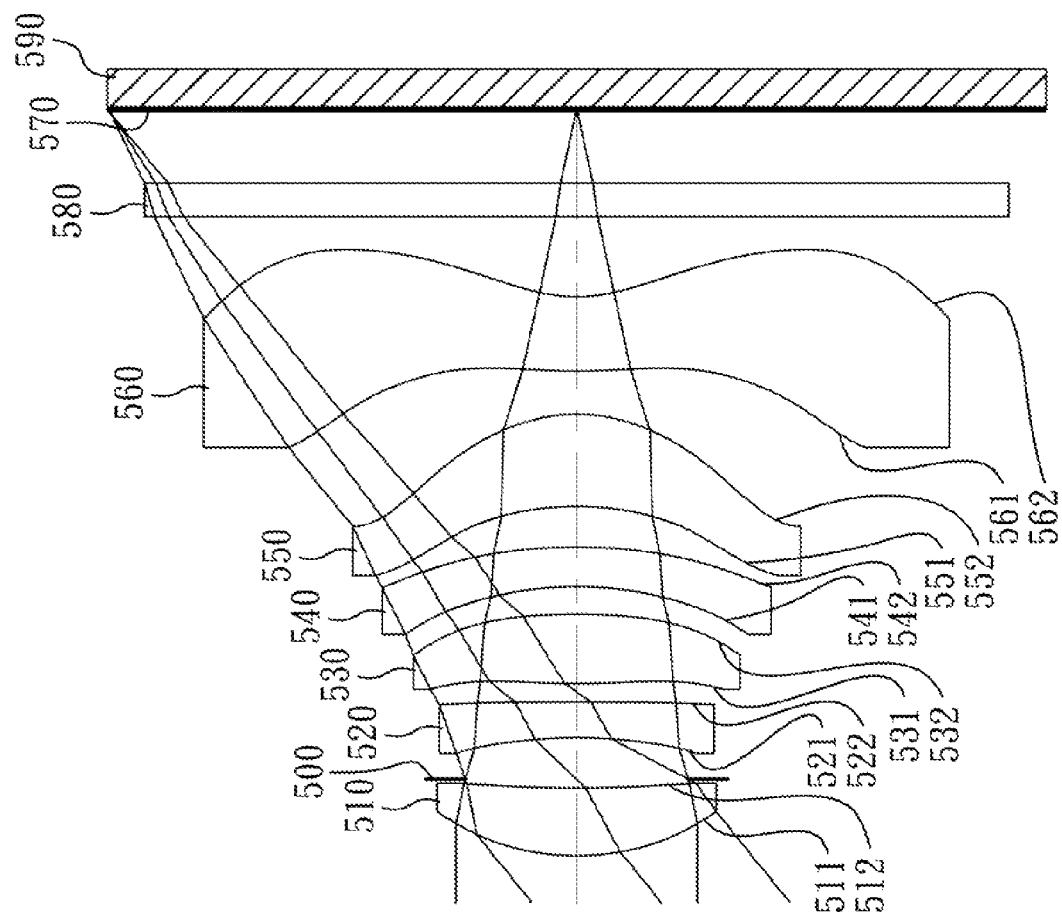
FIG. 9 is a schematic view of an optical photographing system according to the 5th embodiment of the present disclosure.
Figure 10:
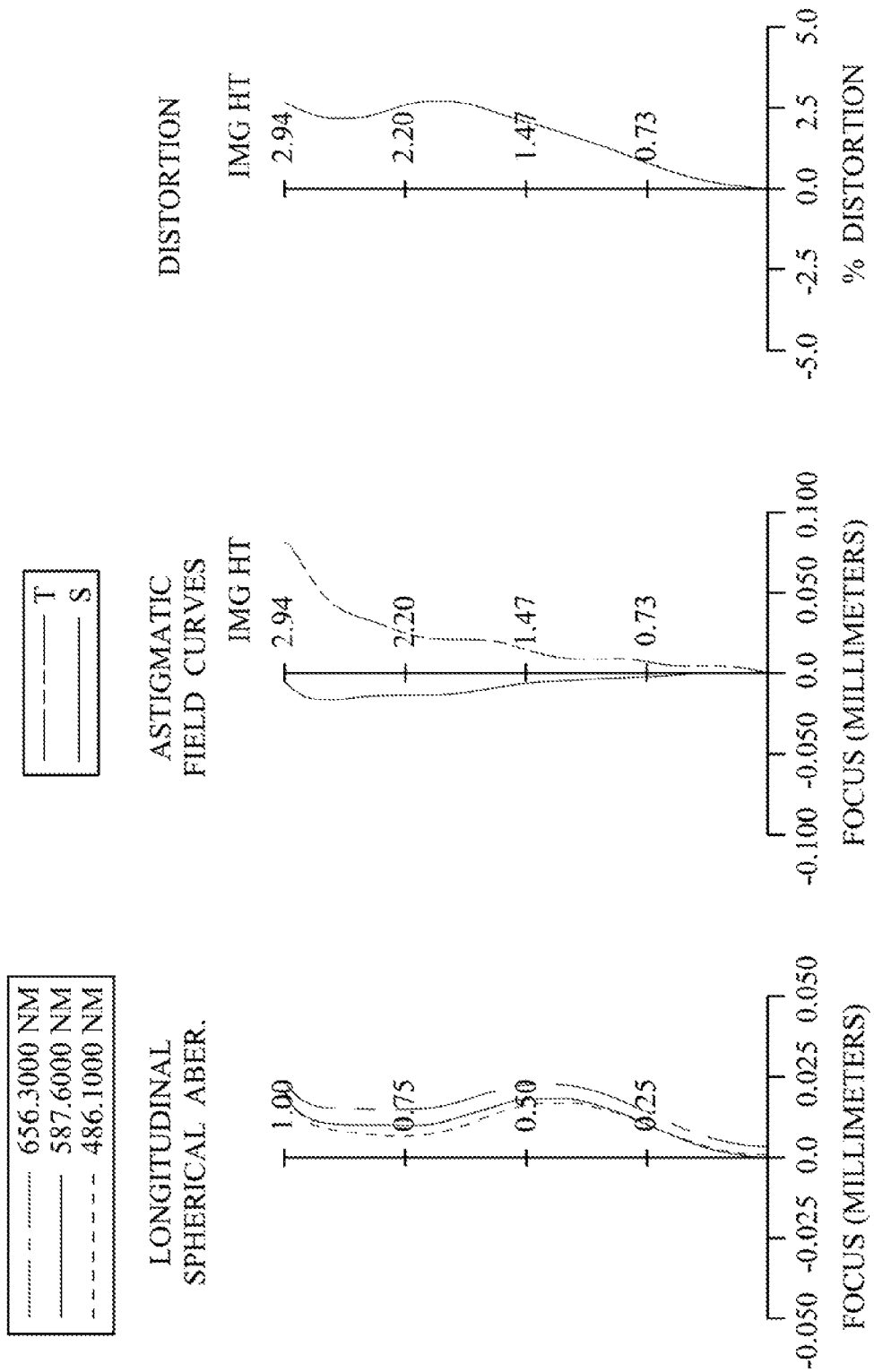
FIG. 10 shows spherical aberration curves, astigmatic field curves and a distortion curve of the optical photographing system according to the 5th embodiment.

FIG. 9 is a schematic view of an optical photographing system according to the 5th embodiment of the present disclosure. FIG. 10 shows spherical aberration curves, astigmatic field curves and a distortion curve of the optical photographing system according to the 5th embodiment. In FIG. 9, the optical photographing system includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570, and an image sensor 590.

The first lens element 510 with positive refractive power has an object-side surface 511 being convex at a paraxial region thereof and an image-side surface 512 being concave at a paraxial region thereof. The first lens element 510 is made of plastic material and has the object-side surface 511 and the image-side surface 512 being both aspheric.

The second lens element 520 with negative refractive power has an image-side surface 522 being convex at a paraxial region thereof. The second lens element 520 is made of plastic material and has the object-side surface 521 and the image-side surface 522 being both aspheric.

The third lens element 530 with positive refractive power has an object-side surface 531 being convex at a paraxial region thereof and an image-side surface 532 being convex at a paraxial region thereof. The third lens element 530 is made of plastic material and has the object-side surface 531 and the image-side surface 532 being both aspheric.

The fourth lens element 540 with negative refractive power has an object-side surface 541 being concave at a paraxial region thereof and an image-side surface 542 being convex at a paraxial region thereof. The fourth lens element 540 is made of plastic material and has the object-side surface 541 and the image-side surface 542 being both aspheric.

The fifth lens element 550 with positive refractive power has an object-side surface 551 being concave at a paraxial region thereof and an image-side surface 552 being convex at a paraxial region thereof. The fifth lens element 550 is made of plastic material and has the object-side surface 551 and the image-side surface 552 being both aspheric.

The sixth lens element 560 with negative refractive power has an object-side surface 561 being convex at a paraxial region thereof and an image-side surface 562 changing from concave at a paraxial region thereof to convex at a peripheral region thereof. The sixth lens element 560 is made of plastic material and has the object-side surface 561 and the image-side surface 562 being both aspheric.

The IR-cut filter 580 made of glass material is located between the sixth lens element 560 and the image plane 570, and will not affect a focal length of the optical photographing system.

The detailed optical data of the 5th embodiment are shown in Table 9, and the aspheric surface data are shown in Table 10 below.

TABLE 9

5th Embodiment
f = 3.56 mm, Fno = 2.35, HFOV = 38.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.585 (ASP) | 0.426 | Plastic | 1.535 | 55.7 | 3.45 |
| 2 | | 10.064 (ASP) | 0.054 | | | | |
| 3 | Ape. Stop | Plano | 0.261 | | | | |
| 4 | Lens 2 | −2.910 (ASP) | 0.220 | Plastic | 1.650 | 21.4 | −4.89 |
| 5 | | −35.714 (ASP) | 0.116 | | | | |
| 6 | Lens 3 | 4.703 (ASP) | 0.438 | Plastic | 1.544 | 55.9 | 4.24 |
| 7 | | −4.390 (ASP) | 0.170 | | | | |
| 8 | Lens 4 | −2.420 (ASP) | 0.250 | Plastic | 1.583 | 30.2 | −17.60 |
| 9 | | −3.287 (ASP) | 0.257 | | | | |
| 10 | Lens 5 | −1.913 (ASP) | 0.580 | Plastic | 1.544 | 55.9 | 3.05 |
| 11 | | −0.984 (ASP) | 0.270 | | | | |
| 12 | Lens 6 | 3.709 (ASP) | 0.466 | Plastic | 1.535 | 56.3 | −2.43 |
| 13 | | 0.920 (ASP) | 0.500 | | | | |
| 14 | IR-cut filter | Plano | 0.210 | Glass | 1.517 | 64.2 | — |
| 15 | | Plano | 0.466 | | | | |
| 16 | Image | Plano | — | | | | |

Note:
Reference wavelength (d-line) is 587.6 nm.

TABLE 10

Aspheric Coefficients

| Surface # | 1 | 2 | 4 | 5 | 6 | 7 |
|---|---|---|---|---|---|---|
| k = | −5.4131E−02 | 2.8065E+01 | −5.0966E+00 | −9.0000E+01 | −5.2304E+00 | 1.0000E+00 |
| A4 = | 1.2595E−02 | 1.8760E−02 | 2.1939E−02 | −7.2363E−02 | −2.5714E−01 | −1.2494E−01 |
| A6 = | 4.0438E−02 | 3.2970E−02 | 1.8796E−01 | 4.1831E−01 | 2.8465E−01 | −1.0601E−02 |
| A8 = | 6.7684E−02 | −2.6971E−01 | −1.0531E+00 | −1.1158E+00 | −5.0141E−01 | 1.2253E−02 |
| A10 = | −4.7221E−01 | 6.7333E−01 | 2.1544E+00 | 1.7703E+00 | 6.2309E−01 | −4.0456E−03 |
| A12 = | 9.3712E−01 | −8.8682E−01 | −2.6884E+00 | −1.7284E+00 | −4.7903E−01 | 3.3522E−03 |
| A14 = | −6.4752E−01 | 2.6609E−01 | 1.2648E+00 | 7.3834E−01 | 1.5915E−01 | |

| Surface # | 8 | 9 | 10 | 11 | 12 | 13 |
|---|---|---|---|---|---|---|
| k = | 1.4838E−01 | 6.6757E−01 | −4.3146E−01 | −1.0245E+00 | −8.1014E+01 | −4.4852E+00 |
| A4 = | −2.2111E−02 | −5.5523E−03 | −2.0471E−02 | 1.2358E−01 | −1.2400E−01 | −1.3494E−01 |
| A6 = | 1.5360E−02 | −1.5995E−02 | −1.3824E−01 | −2.0637E−01 | −1.0171E−01 | 6.8124E−02 |
| A8 = | −2.1172E−02 | 8.7100E−03 | −1.0187E−02 | 1.0851E−01 | 2.0694E−01 | −2.1981E−02 |
| A10 = | −7.7224E−05 | 4.7037E−03 | 2.6145E−01 | 1.9382E−01 | −1.4170E−01 | 4.0875E−03 |
| A12 = | −3.0239E−09 | −1.6699E−03 | −1.7846E−01 | −1.9091E−02 | 4.7814E−02 | −4.5986E−04 |
| A14 = | | | 3.5322E−02 | 2.5135E−03 | −7.8970E−03 | 2.9808E−05 |
| A16 = | | | | | 5.1034E−04 | −8.2094E−07 |

In the optical photographing system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f (mm) | 3.56 | (R9 − R10)/(R9 + R10) | 0.32 |
|---|---|---|---|
| Fno | 2.35 | R12/|R11| | 0.25 |
| HFOV (deg.) | 38.7 | f2/R4 | 0.14 |
| V2/V1 | 0.38 | f1/f6 | −1.42 |
| CT4/CT3 | 0.57 | f/f3 | 0.84 |
| R3/R2 | −0.29 | Yc62/f | 0.40 |
| R3/|R4| | −0.08 | TTL/ImgH | 1.57 |
| (R7 − R8)/(R7 + R8) | −0.15 | | |

6th Embodiment

Figure 11:
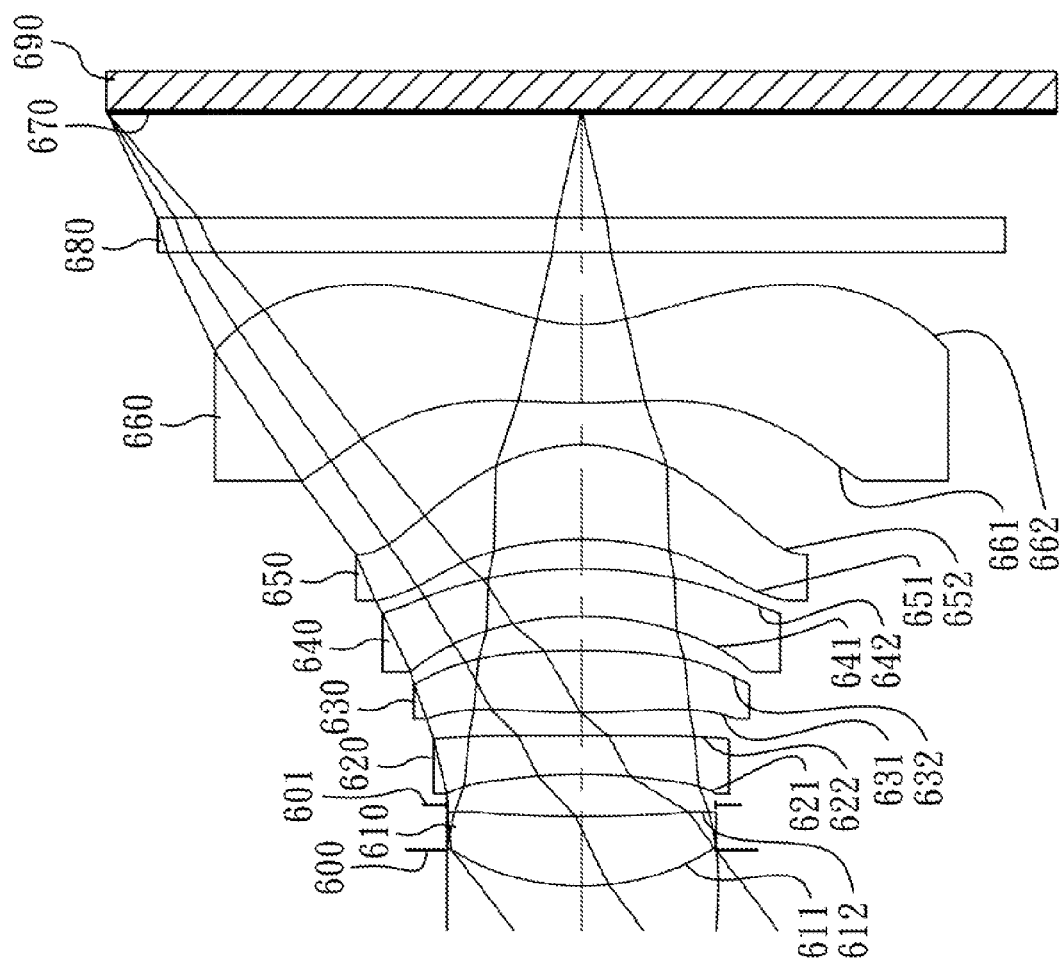
FIG. 11 is a schematic view of an optical photographing system according to the 6th embodiment of the present disclosure.
Figure 12:
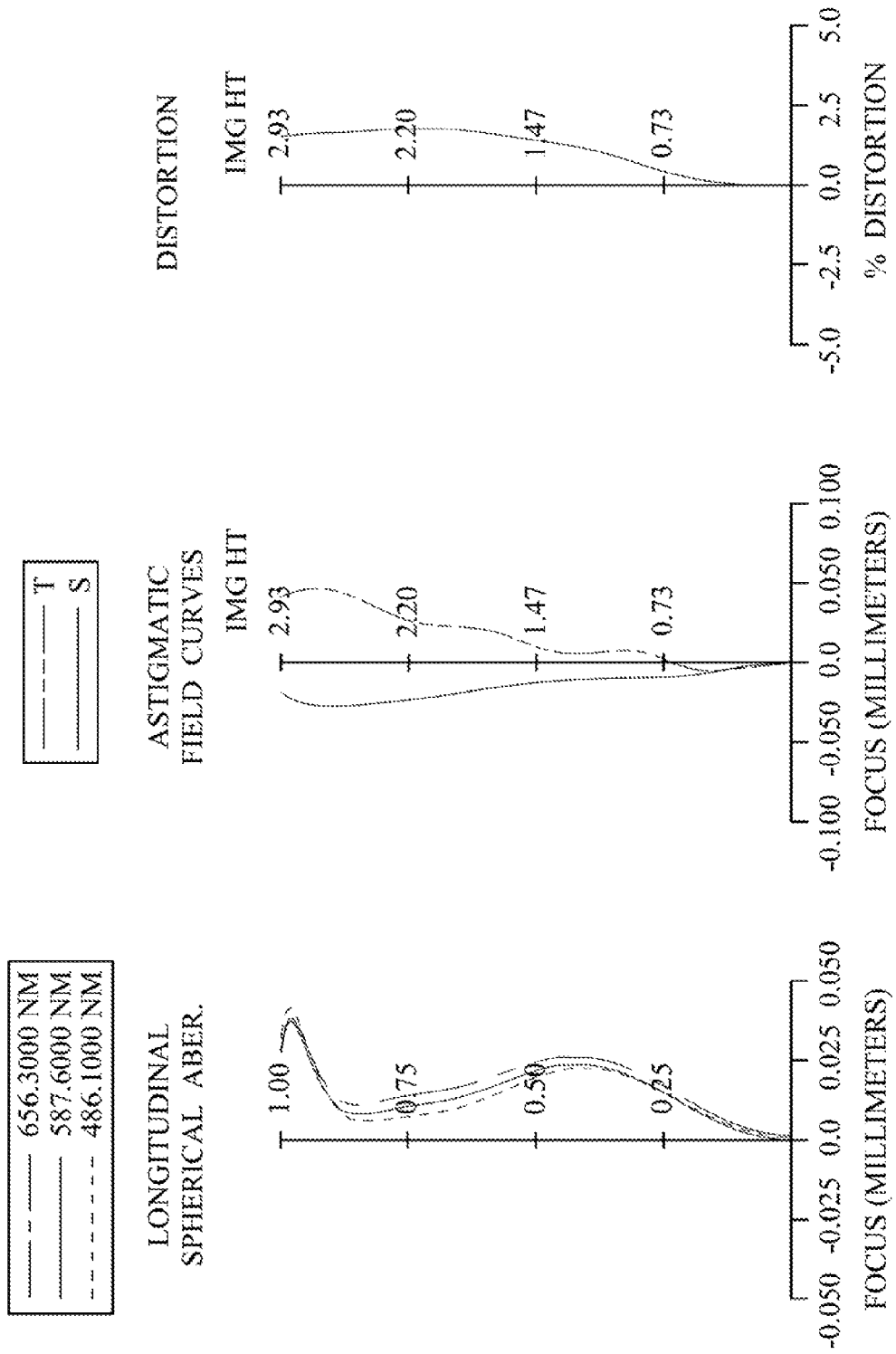
FIG. 12 shows spherical aberration curves, astigmatic field curves and a distortion curve of the optical photographing system according to the 6th embodiment.

FIG. 11 is a schematic view of an optical photographing system according to the 6th embodiment of the present disclosure. FIG. 12 shows spherical aberration curves, astigmatic field curves and a distortion curve of the optical photographing system according to the 6th embodiment. In FIG. 11, the optical photographing system includes, in order from an object side to an image side, an aperture stop 600, a first lens element 610, a stop 601, a second lens element 620, a third lens element 630, a fourth lens element 640, a fifth lens element 650, a sixth lens element 660, an IR-cut filter 680, an image plane 670, and an image sensor 690.

The first lens element 610 with positive refractive power has an object-side surface 611 being convex at a paraxial region thereof and an image-side surface 612 being concave at a paraxial region thereof. The first lens element 610 is made of plastic material and has the object-side surface 611 and the image-side surface 612 being both aspheric.

The second lens element 620 with negative refractive power has an object-side surface 621 being concave at a paraxial region thereof and an image-side surface 622 being convex at a paraxial region thereof. The second lens element 620 is made of plastic material and has the object-side surface 621 and the image-side surface 622 being both aspheric.

The third lens element 630 with positive refractive power has an object-side surface 631 being convex at a paraxial region thereof and an image-side surface 632 being convex at a paraxial region thereof. The third lens element 630 is made of plastic material and has the object-side surface 631 and the image-side surface 632 being both aspheric.

The fourth lens element 640 with negative refractive power has an object-side surface 641 being concave at a paraxial region thereof and an image-side surface 642 being convex at a paraxial region thereof. The fourth lens element 640 is made of plastic material and has the object-side surface 641 and the image-side surface 642 being both aspheric.

The fifth lens element 650 with positive refractive power has an object-side surface 651 being concave at a paraxial region thereof and an image-side surface 652 being convex at a paraxial region thereof. The fifth lens element 650 is made of plastic material and has the object-side surface 651 and the image-side surface 652 being both aspheric.

The sixth lens element 660 with negative refractive power has an object-side surface 661 being convex at a paraxial region thereof and an image-side surface 662 changing from concave at a paraxial region thereof to convex at a peripheral region thereof. The sixth lens element 660 is made of plastic material and has the object-side surface 661 and the image-side surface 662 being both aspheric.

The IR-cut filter 680 made of glass material is located between the sixth lens element 660 and the image plane 670, and will not affect a focal length of the optical photographing system.

The detailed optical data of the 6th embodiment are shown in Table 11, and the aspheric surface data are shown in Table 12 below.

TABLE 11

6th Embodiment
f = 3.74 mm, Fno = 2.25, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.226 | | | | |
| 2 | Lens 1 | 1.581 (ASP) | 0.435 | Plastic | 1.544 | 55.9 | 3.40 |
| 3 | | 9.772 (ASP) | 0.071 | | | | |
| 4 | Stop | Plano | 0.188 | | | | |
| 5 | Lens 2 | −3.351 (ASP) | 0.240 | Plastic | 1.640 | 23.3 | −5.42 |
| 6 | | −100.000 (ASP) | 0.139 | | | | |
| 7 | Lens 3 | 3.952 (ASP) | 0.386 | Plastic | 1.544 | 55.9 | 4.70 |
| 8 | | −6.987 (ASP) | 0.213 | | | | |
| 9 | Lens 4 | −1.961 (ASP) | 0.290 | Plastic | 1.640 | 23.3 | −10.11 |
| 10 | | −2.977 (ASP) | 0.185 | | | | |
| 11 | Lens 5 | −2.241 (ASP) | 0.583 | Plastic | 1.544 | 55.9 | 2.95 |
| 12 | | −1.022 (ASP) | 0.264 | | | | |
| 13 | Lens 6 | 4.353 (ASP) | 0.480 | Plastic | 1.535 | 56.3 | −2.54 |
| 14 | | 0.995 (ASP) | 0.450 | | | | |
| 15 | IR-cut filter | Plano | 0.210 | Glass | 1.517 | 64.2 | — |
| 16 | | Plano | 0.658 | | | | |
| 17 | Image | Plano | — | | | | |

Note:
Reference wavelength (d-line) is 587.6 nm.
Radius of the stop opening of Surface 4 is 0.83 mm.

TABLE 12

Aspheric Coefficients

| Surface # | 2 | 3 | 5 | 6 | 7 | 8 |
|---|---|---|---|---|---|---|
| k = | −9.1180E−02 | 4.9602E+01 | −6.1902E+00 | −9.0000E+01 | −4.9078E+00 | 1.0000E+00 |
| A4 = | 1.2055E−02 | 1.7799E−02 | 2.6553E−02 | −7.4290E−02 | −2.5721E−01 | −1.2425E−01 |
| A6 = | 3.5010E−02 | 2.6838E−02 | 2.0506E−01 | 4.1170E−01 | 2.8374E−01 | −9.4178E−03 |
| A8 = | 7.3624E−02 | −2.5007E−01 | −1.0527E+00 | −1.1231E+00 | −5.0292E−01 | 1.2638E−02 |
| A10 = | −4.8056E−01 | 6.1879E−01 | 2.1214E+00 | 1.7729E+00 | 6.1914E−01 | −3.1119E−03 |
| A12 = | 9.3671E−01 | −8.8601E−01 | −2.6876E+00 | −1.7292E+00 | −4.7903E−01 | 3.3522E−03 |
| A14 = | −6.4706E−01 | 2.6495E−01 | 1.2660E+00 | 7.3734E−01 | 1.5915E−01 | |

| Surface # | 9 | 10 | 11 | 12 | 13 | 14 |
|---|---|---|---|---|---|---|
| k = | −3.9127E−01 | 9.9892E−01 | −1.0030E−01 | −1.0040E+00 | −9.0000E+01 | −4.8651E+00 |
| A4 = | −1.0670E−02 | −9.4238E−03 | −2.0405E−02 | 1.2358E−01 | −1.3438E−01 | −1.3868E−01 |
| A6 = | 6.4518E−03 | −1.0854E−02 | −1.3838E−01 | −2.0637E−01 | −1.0010E−01 | 6.7351E−02 |
| A8 = | −2.7338E−02 | 7.7540E−03 | −1.0310E−02 | 1.0851E−01 | 2.0730E−01 | −2.1684E−02 |
| A10 = | | 5.8641E−03 | 2.6138E−01 | 1.9382E−02 | −1.4170E−01 | 4.1010E−03 |
| A12 = | | −1.7697E−03 | −17847E−01 | −1.9091E−02 | 4.7835E−02 | −4.6202E−04 |
| A14 = | | | 3.5353E−02 | 2.5135E−03 | −7.8965E−03 | 2.9530E−05 |
| A16 = | | | | | 5.0740E−04 | −8.9807E−07 |

In the optical photographing system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.74 | (R9 − R10)/(R9 + R10) | 0.37 |
| Fno | 2.25 | R12/|R11| | 0.23 |
| HFOV (deg.) | 37.6 | f2/R4 | 0.05 |
| V2/V1 | 0.42 | f1/f6 | −1.34 |
| CT4/CT3 | 0.75 | f/f3 | 0.80 |
| R3/R2 | −0.34 | Yc62/f | 0.35 |
| R3/|R4| | −0.03 | TTL/ImgH | 1.61 |
| (R7 − R8)/(R7 + R8) | −0.21 | | |

7th Embodiment

Figure 13:
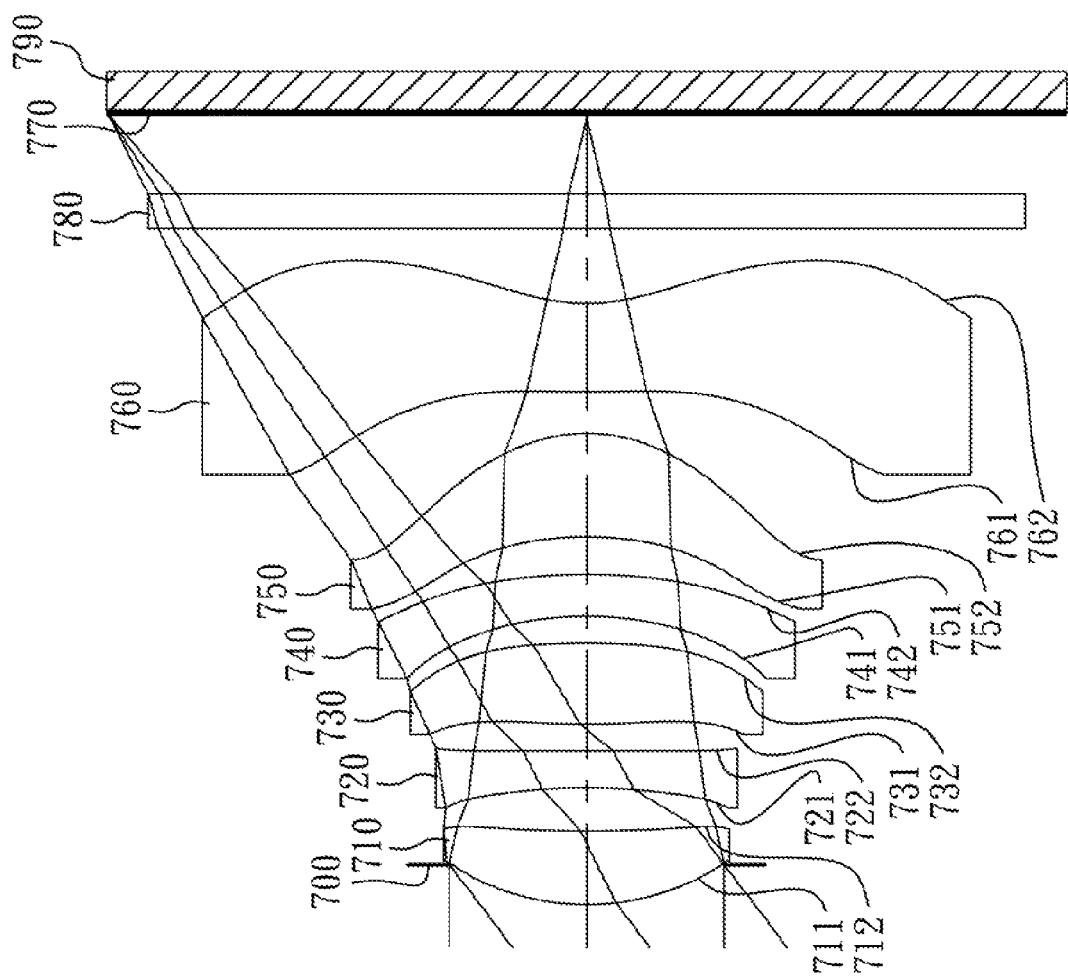
FIG. 13 is a schematic view of an optical photographing system according to the 7th embodiment of the present disclosure.
Figure 14:
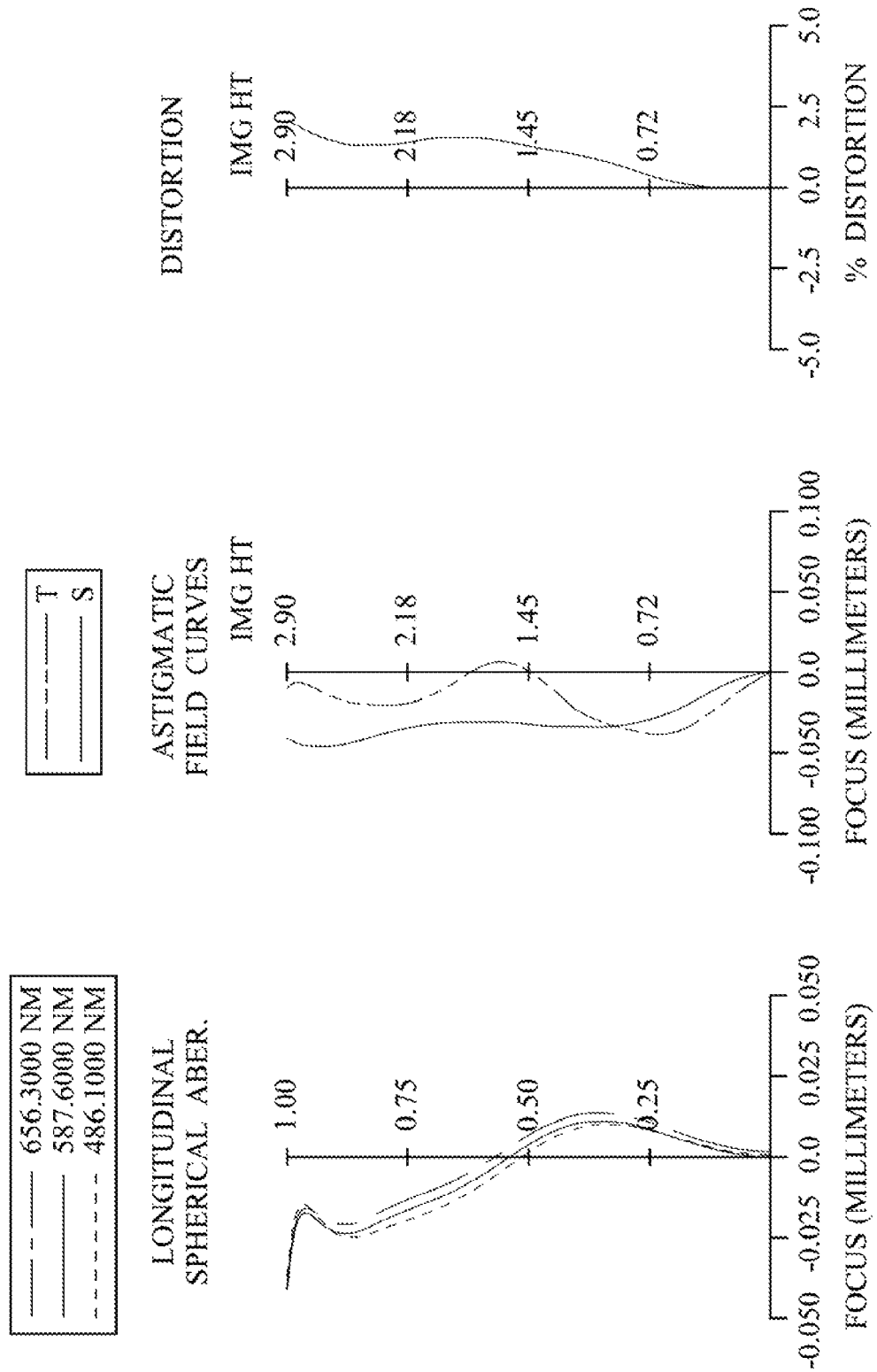
FIG. 14 shows spherical aberration curves, astigmatic field curves and a distortion curve of the optical photographing system according to the 7th embodiment.

FIG. 13 is a schematic view of an optical photographing system according to the 7th embodiment of the present disclosure. FIG. 14 shows spherical aberration curves, astigmatic field curves and a distortion curve of the optical photographing system according to the 7th embodiment. In FIG. 13, the optical photographing system includes, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770, and an image sensor 790.

The first lens element 710 with positive refractive power has an object-side surface 711 being convex at a paraxial region thereof and an image-side surface 712 being concave at a paraxial region thereof. The first lens element 710 is made of plastic material and has the object-side surface 711 and the image-side surface 712 being both aspheric.

The second lens element 720 with negative refractive power has an object-side surface 721 being concave at a paraxial region thereof and an image-side surface 722 being concave at a paraxial region thereof. The second lens element 720 is made of plastic material and has the object-side surface 721 and the image-side surface 722 being both aspheric.

The third lens element 730 with positive refractive power has an object-side surface 731 being convex at a paraxial region thereof and an image-side surface 732 being convex at a paraxial region thereof. The third lens element 730 is made of plastic material and has the object-side surface 731 and the image-side surface 732 being both aspheric.

The fourth lens element 740 with negative refractive power has an object-side surface 741 being concave at a paraxial region thereof and an image-side surface 742 being convex at a paraxial region thereof. The fourth lens element 740 is made of plastic material and has the object-side surface 741 and the image-side surface 742 being both aspheric.

The fifth lens element 750 with positive refractive power has an object-side surface 751 being concave at a paraxial region thereof and an image-side surface 752 being convex at a paraxial region thereof. The fifth lens element 750 is made of plastic material and has the object-side surface 751 and the image-side surface 752 being both aspheric.

The sixth lens element 760 with negative refractive power has an object-side surface 761 being convex at a paraxial region thereof and an image-side surface 762 changing from concave at a paraxial region thereof to convex at a peripheral region thereof. The sixth lens element 760 is made of plastic material and has the object-side surface 761 and the image-side surface 762 being both aspheric.

The IR-cut filter 780 made of glass material is located between the sixth lens element 760 and the image plane 770, and will not affect a focal length of the optical photographing system.

The detailed optical data of the 7th embodiment are shown in Table 13, and the aspheric surface data are shown in Table 14 below.

TABLE 13

7th Embodiment
f = 3.73 mm, Fno = 2.25, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.243 | | | | |
| 2 | Lens 1 | 1.529 (ASP) | 0.448 | Plastic | 1.544 | 55.9 | 3.31 |
| 3 | | 9.050 (ASP) | 0.262 | | | | |
| 4 | Lens 2 | −3.292 (ASP) | 0.224 | Plastic | 1.640 | 23.3 | −5.12 |
| 5 | | 691.706 (ASP) | 0.157 | | | | |
| 6 | Lens 3 | 4.184 (ASP) | 0.493 | Plastic | 1.544 | 55.9 | 4.40 |
| 7 | | −5.358 (ASP) | 0.163 | | | | |
| 8 | Lens 4 | −2.125 (ASP) | 0.250 | Plastic | 1.608 | 25.7 | −9.42 |
| 9 | | −3.529 (ASP) | 0.230 | | | | |
| 10 | Lens 5 | −2.078 (ASP) | 0.625 | Plastic | 1.530 | 55.8 | 2.71 |
| 11 | | −0.939 (ASP) | 0.253 | | | | |
| 12 | Lens 6 | 13.223 (ASP) | 0.533 | Plastic | 1.535 | 56.3 | −2.27 |
| 13 | | 1.095 (ASP) | 0.450 | | | | |
| 14 | IR-cut filter | Plano | 0.210 | Glass | 1.517 | 64.2 | — |
| 15 | | Plano | 0.494 | | | | |
| 16 | Image | Plano | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | −7.1823E−02 | 3.7073E+01 | −6.5921E+00 | −1.0000E+00 | −5.3867E+00 | 2.1461E−01 |
| A4 = | 1.1397E−02 | 1.3738E−02 | 2.7355E−02 | −7.2897E−02 | −2.5957E−01 | −1.2894E−01 |
| A6 = | 4.1750E−02 | 3.1004E−02 | 2.0302E−01 | 4.3274E−01 | 2.6036E−01 | −2.0494E−02 |
| A8 = | 6.5444E−02 | −2.7508E−01 | −1.0189E+00 | −1.1179E+00 | −5.1863E−01 | 7.6829E−03 |
| A10 = | −4.8179E−01 | 6.4252E−01 | 2.1313E+00 | 1.8104E+00 | 6.3710E−01 | −7.5043E−03 |
| A12 = | 9.3693E−01 | −8.8682E−01 | −2.6896E+00 | −1.7295E+00 | −4.7898E−01 | 3.3789E−03 |
| A14 = | −6.4782E−01 | 2.6438E−01 | 1.2853E+00 | 7.3644E−01 | 1.5877E−01 | |

| Surface # | 8 | 9 | 10 | 11 | 12 | 13 |
|---|---|---|---|---|---|---|
| k = | 2.3130E−01 | 9.9981E−01 | −1.9585E−02 | −1.0165E+00 | −1.1536E+00 | −4.3306E+00 |
| A4 = | −2.4392E−02 | −1.0207E−02 | −2.7991E−02 | 1.2262E−01 | −1.2807E−01 | −1.3690E−01 |
| A6 = | 1.1377E−02 | −1.9047E−02 | −1.4014E−01 | −2.0621E−01 | −1.0145E−01 | 6.6894E−02 |
| A8 = | −3.0817E−02 | 5.3343E−03 | −1.0299E−02 | 1.0817E−01 | 2.0719E−01 | −2.1552E−02 |
| A10 = | | 4.1228E−03 | 2.6286E−01 | 1.8965E−02 | −1.4160E−01 | 4.0844E−03 |
| A12 = | | −1.0054E−03 | −1.7728E−01 | −1.9239E−02 | 4.7817E−02 | −4.5972E−04 |
| A14 = | | | 3.4690E−02 | 2.7011E−03 | −7.9005E−03 | 2.9078E−05 |
| A16 = | | | | | 5.0955E−04 | −7.5220E−07 |

In the optical photographing system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.73 | (R9 − R10)/(R9 + R10) | 0.38 |
| Fno | 2.25 | R12/|R11| | 0.08 |
| HFOV (deg.) | 37.3 | f2/R4 | −0.01 |
| V2/V1 | 0.42 | f1/f6 | −1.46 |
| CT4/CT3 | 0.51 | f/f3 | 0.85 |
| R3/R2 | −0.36 | Yc62/f | 0.37 |
| R3/|R4| | 0.00 | TTL/ImgH | 1.63 |
| (R7 − R8)/(R7 + R8) | −0.25 | | |

It will be apparent to those skilled in the art that various modifications and variations can be made to the structure of the present disclosure without to departing from the scope or spirit of the disclosure. In view of the foregoing, it is intended that the present disclosure cover modifications and variations of this disclosure provided they fail within the scope of the following claims.

What is claimed is:

1. An optical photographing system comprising, in order from an object side to an image side:

a first lens element with positive refractive power having an object-side surface being convex at a paraxial region thereof;

a second lens element with negative refractive power having an object-side surface being concave at a paraxial region thereof;

a third lens element having refractive power;

a fourth lens element having refractive power;

a fifth lens element with positive refractive power having an image-side surface being convex at a paraxial region thereof, wherein an object-side surface and the image-side surface of the fifth lens element are aspheric; and a sixth lens element with refractive power having an mage-side surface, wherein the image-side surface of the sixth lens element changes from concave at a paraxial region thereof to convex at a peripheral region thereof, and an object-side surface and the image-side surface of the sixth lens element are aspheric;

wherein a curvature radius of the object-side surface of the second lens element is R3, a curvature radius of an image-side surface of the second lens element is R4, and the following relationship is satisfied:

−0.70<R3/|R4|≤0.

2. The optical photographing system of claim 1, wherein the sixth lens element has negative refractive power.

3. The optical photographing system of claim 2, wherein the third lens element has positive refractive power.

4. The optical photographing system of claim 3, wherein the object-side surface of the fifth lens element is concave at a paraxial region thereof.

5. The optical photographing system of claim 4, wherein the fourth lens element has an object-side surface being concave at a paraxial region thereof.

6. The optical photographing system of claim 5, wherein the first lens element has an image-side surface being concave at a paraxial region thereof, the image-side surface of the second lens element is convex or planar at a paraxial region thereof, and the fourth lens element has an image-side surface being convex at a paraxial region thereof.

7. The optical photographing system of claim 6, wherein the third lens element has an object-side surface and an image-side surface being both convex at a paraxial region thereof.

8. The optical photographing system of claim 5, wherein a curvature radius of the object-side surface of the fourth lens element is R7, a curvature radius of an image-side surface of the fourth lens element is R8, and the following relationship is satisfied:

−0.40<(R7−R8)/(R7+R8)<0.30.

9. The optical photographing system of claim 4, wherein a focal length of the second lens element is f2, the curvature radius of the image-side surface of the second lens element is R4, and the following relationship is satisfied:

−0.1<f2/R4<1.

10. The optical photographing system of claim 3, wherein a curvature radius of the object-side surface of the sixth lens element is R11, a curvature radius of the image-side surface of the sixth lens element is R12, and the following relationship is satisfied:

0≤R12/|R11|<1.0.

11. The optical photographing system of claim 3, wherein the object-side surface of the sixth lens element is convex at a paraxial region thereof.

12. The optical photographing system of claim 11, wherein the fourth lens element with negative refractive power has an object-side surface being concave at a paraxial region thereof and an image-side surface being convex at a paraxial region thereof.

13. The optical photographing system of claim 3, wherein a central thickness of the third lens element is CT3, a central thickness of the fourth lens element is CT4, and the following relationship is satisfied:

0.30<CT4/CT3<0.80.

14. The optical photographing system of claim 3, wherein the curvature radius of the object-side surface of the second lens element is R3, the curvature radius of the image-side surface of the second lens element is R4, and the following relationship is satisfied:

−0.45<R3/|R4|≤0.

15. The optical photographing system of claim 3, wherein an axial distance between the object-side surface of the first lens element and an image plane is TTL, a maximum image height of the optical photographing system is to ImgH, and the following relationship is satisfied:

TTL/ImgH<1.8.

16. The optical photographing system of claim 2, wherein an Abbe number of the first lens element is V1, an Abbe number of the second lens element is V2, and the following relationship is satisfied:

0.2<V2/V1<0.6.

17. The optical photographing system of claim 2, wherein a minimum distance between a non-axial critical point on the image-side surface of the sixth lens element and an optical axis is Yc62, a focal length of the optical photographing system is f, and the following relationship is satisfied:

0.10<Yc62/f<0.90.

18. An optical photographing system comprising, in order from an object side to an image side:
a first lens element with positive refractive power having an object-side surface being convex at a paraxial region thereof;
a second lens element with negative refractive power having an object-side surface being concave at a paraxial region thereof and an image-side surface being convex or planar at a paraxial region thereof;
a third lens element having positive refractive power;
a fourth lens element having refractive power;
a fifth lens element with positive refractive power having an image-side surface being convex at a paraxial region thereof, wherein an object-side surface and the image-side surface of the fifth lens element are aspheric; and
a sixth lens element with negative refractive power having an image-side surface, wherein the image-side surface of the sixth lens element changes from concave at a paraxial region thereof to convex at a peripheral region thereof, and an object-side surface and the image-side surface of the sixth lens element are aspheric;
wherein a curvature radius of the object-side surface of the second lens element is R3, a curvature radius of the image-side surface of the second lens element is R4, and the following relationship is satisfied:

−0.70<R3/|R4|≤0.

19. The optical photographing system of claim 18, wherein a focal length of the optical photographing system is f, a focal length of the third lens element is f3, and the following relationship is satisfied:

0.3<f/f3<1.5.

20. The optical photographing system of claim 18, wherein the fourth lens element with negative refractive power has an object-side surface being concave at a paraxial region thereof and an image-side surface being convex at a paraxial region thereof.

21. The optical photographing system of claim 18, wherein a curvature radius of the object-side surface of the fifth lens element is R9, a curvature radius of the image-side surface of the fifth lens element is R10, and the following relationship is satisfied:

$$0.10<(R9-R10)/(R9+R10)<0.70.$$

22. The optical photographing system of claim 18, wherein a minimum distance between a non-axial critical point on the image-side surface of the sixth lens element and an optical axis is Yc62, a focal length of the optical photographing system is f, and the following relationship is satisfied:

$$0.10<Yc62/f<0.90.$$

23. The optical photographing system of claim 18, wherein an Abbe number of the first lens element is V1, an Abbe number of the second lens element is V2, and the following relationship is satisfied:

$$0.2<V2/V1<0.6.$$

24. The optical photographing system of claim 18, wherein a focal length of the first lens element is f1, a focal length of the sixth lens element is f6, and the following relationship is satisfied:

$$-1.8<f/f6<-0.9.$$

25. The optical photographing system f claim 18, wherein a curvature radius of an image-side surface of the first lens element is R2, the curvature radius of the object-side surface of the second lens element is R3, and the following relationship is satisfied:

$$-0.45<R3/R2<0.$$

26. The optical photographing system of claim 18, wherein a curvature radius of the object-side surface of the sixth lens element is R11, a curvature radius of the image-side surface of the sixth lens element is R12, and the following relationship is satisfied:

$$0 \leq R12/|R11|<1.0.$$

* * * * *

UNITED STATES PATENT AND TRADEMARK OFFICE
CERTIFICATE OF CORRECTION

PATENT NO. : 8,780,457 B2
APPLICATION NO. : 13/691855
DATED : July 15, 2014
INVENTOR(S) : Hsiang-Chi Tang and Hsin-Hsuan Huang It is certified that error appears in the above-identified patent and that said Letters Patent is hereby corrected as shown below:

In the Claims:

(1) In column 26, lines 66-67, Claim 1 of the issued patent reads as "... a sixth lens element with refractive power having an mage-side surface...", but it should read as "... a sixth lens element with refractive power having an image-side surface...".

(2) In column 30, line 3, Claim 24 of the issued patent reads as "-1.8 < f/f6 < -0.9", but it should read as "-1.8 < f1/f6 < -0.9.".

Signed and Sealed this
Seventh Day of October, 2014

Michelle K. Lee
*Deputy Director of the United States Patent and Trademark Office*